United States Patent
Wang et al.

(10) Patent No.: US 11,941,213 B2
(45) Date of Patent: Mar. 26, 2024

(54) TOUCH STRUCTURE AND DISPLAY PANEL

(71) Applicants: Chengdu BOE Optoelectronics Technology Co., Ltd., Sichuan (CN); BOE TECHNOLOGY GROUP CO., LTD., Beijing (CN)

(72) Inventors: Wei Wang, Beijing (CN); Yi Zhang, Beijing (CN); Fuqiang Yang, Beijing (CN); Chao Zeng, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/789,581

(22) PCT Filed: Aug. 30, 2021

(86) PCT No.: PCT/CN2021/115363
§ 371 (c)(1),
(2) Date: Jun. 28, 2022

(87) PCT Pub. No.: WO2022/062843
PCT Pub. Date: Mar. 31, 2022

(65) Prior Publication Data
US 2023/0049340 A1 Feb. 16, 2023

(30) Foreign Application Priority Data
Sep. 27, 2020 (WO) ................ PCT/CN2020/118087

(51) Int. Cl.
*G06F 3/044* (2006.01)
(52) U.S. Cl.
CPC .......... *G06F 3/0446* (2019.05); *G06F 3/0443* (2019.05); *G06F 3/0448* (2019.05);
(Continued)

(58) Field of Classification Search
CPC .... G06F 3/0446; G06F 3/0443; G06F 3/0448; G06F 3/0412; G06F 3/04184;
(Continued)

(56) References Cited

U.S. PATENT DOCUMENTS 11,442,587 B2  9/2022  Song et al.
11,604,553 B2  3/2023  Song et al.
(Continued)

FOREIGN PATENT DOCUMENTS

CN   108984013 A   12/2018
CN   109213372 A    1/2019
(Continued)

OTHER PUBLICATIONS

USPTO, First Office Action dated Jun. 5, 2023 for U.S. Appl. No. 17/419,679.
(Continued)

*Primary Examiner* — Brent D Castiaux
(74) *Attorney, Agent, or Firm* — HOUTTEMAN LAW LLC

(57) ABSTRACT

A touch structure and a display panel are provided. The touch structure includes: first mesh electrodes extending in a first direction and second mesh electrodes extending in a second direction. The touch structure is absent in a window region. First mesh electrodes include at least one cross-window row separated by the window region, which includes a first cross-window row including: a first window mesh block adjacent to the window region and on a first side of the window region; a first conductive plate directly connected to mesh lines of the first window mesh block; and a first non-window mesh block on a side of the first window mesh block away from the window region; second mesh electrodes include at least one cross-window column including a first cross-window column which includes: a second
(Continued)

window mesh block; a second conductive plate; and a second non-window mesh block.

19 Claims, 16 Drawing Sheets

(52) U.S. Cl.
CPC .............. *G06F 2203/04104* (2013.01); *G06F 2203/04107* (2013.01); *G06F 2203/04111* (2013.01); *G06F 2203/04112* (2013.01)

(58) Field of Classification Search
CPC . G06F 2203/04104; G06F 2203/04107; G06F 2203/04111; G06F 2203/04112
See application file for complete search history.

(56) References Cited

U.S. PATENT DOCUMENTS

| | | | | |
|---|---|---|---|---|
| 2019/0079622 | A1* | 3/2019 | Choi | G06F 3/0443 |
| 2020/0064968 | A1* | 2/2020 | Kim | G06F 3/0412 |
| 2020/0142525 | A1* | 5/2020 | Han | H10K 59/40 |
| 2020/0183538 | A1 | 6/2020 | Li et al. | |
| 2021/0357079 | A1 | 11/2021 | Song et al. | |
| 2021/0397320 | A1* | 12/2021 | Ye | G06F 3/0448 |
| 2022/0190043 | A1 | 6/2022 | Ge | |
| 2022/0350446 | A1 | 11/2022 | Song et al. | |
| 2022/0384533 | A1 | 12/2022 | Jang et al. | |

FOREIGN PATENT DOCUMENTS

| | | |
|---|---|---|
| CN | 109360837 A | 2/2019 |
| CN | 109388288 A | 2/2019 |
| CN | 109545085 A | 3/2019 |
| CN | 110007804 A | 7/2019 |
| CN | 110837314 A | 2/2020 |
| CN | 110874160 A | 3/2020 |
| CN | 110968220 A | 4/2020 |
| CN | 111158514 A | 5/2020 |
| CN | 111538443 A | 8/2020 |
| CN | 111708461 A | 9/2020 |
| WO | 2020080740 A1 | 4/2020 |

OTHER PUBLICATIONS

USPTO, First Office Action dated May 23, 2023 for U.S. Appl. No. 17/792,213.

China Patent Office, First Office Action dated May 27, 2023 for application No. CN202180002458.9 .

* cited by examiner

TOUCH STRUCTURE AND DISPLAY PANEL

CROSS REFERENCE TO RELATED APPLICATIONS

The present application claims the priority of the PCT Application No. PCT/CN2020/118087 filed on Sep. 27, 2020, the content of which is incorporated herein by reference in its entirety.

TECHNICAL FIELD

The present disclosure relates to the field of display technology, in particular to a touch structure and a display panel.

BACKGROUND

Various types of touch panels have been developed. Examples of touch panels include one-glass-solution (OGS) touch panels, on-cell touch panels, and in-cell touch panels. The on-cell touch panels provide high touch control accuracy. The on-cell touch panels can be classified into single-layer-on-cell (SLOC) touch panels and multi-layer-on-cell (MLOC) touch panels. In particular, multiple point touch control can be achieved in the MLOC touch panels with superior touch control accuracy and blanking effects.

SUMMARY

The present disclosure provides a touch structure and a display panel.

The touch structure includes: a plurality of first mesh electrodes extending in a first direction and a plurality of second mesh electrodes extending in a second direction intersecting the first direction,
wherein the touch structure is defined in a touch region and is absent in a window region surrounded by the touch region;
wherein the plurality of first mesh electrodes include at least one cross-window row separated by the window region, the at least one cross-window row includes a first cross-window row and the first cross-window row includes:
a first window mesh block adjacent to the window region and on a first side of the window region;
a first conductive plate directly connected to a plurality of mesh lines of the first window mesh block; and
a first non-window mesh block on a side of the first window mesh block away from the window region;
wherein the plurality of second mesh electrodes include at least one cross-window column separated by the window region, the at least one cross-window column includes a first cross-window column and the first cross-window column includes:
a second window mesh block adjacent to the window region and on a second side of the window region;
a second conductive plate directly connected to a plurality of mesh lines of the second window mesh block; and
a second non-window mesh block on a side of the second window mesh block away from the window region;
wherein the first and second conductive plates extend along first and second portions of a periphery of the window region, respectively;
an area of the first conductive plate is positively correlated to that of a missing portion of the first window mesh block with respect to the first non-window mesh block, and an area of the second conductive plate is positively correlated to that of a missing portion of the second window mesh block with respect to the second non-window mesh block.

In one embodiment, the first conductive plate and the second conductive plate are both fan-shaped rings.

In one embodiment, an area of the first non-window mesh block is substantially equal to that of the second non-window mesh block;
an area of the first window mesh block is greater than ½ of the area of the first non-window mesh block, an area of the second mesh window-block is greater than ½ of the area of the second non-window mesh block;
a length of the first conductive plate close to the window region is greater than that of the second conductive plate close to the window region; and
a first width of the first conductive plate along a third direction perpendicular to an interface between the first conductive plate and the first window mesh block is greater than a second width of the second conductive plate along a fourth direction perpendicular to an interface between the second conductive plate and the second window mesh block.

In one embodiment, an area of the first non-window mesh block is substantially equal to that of the second non-window mesh block;
an area of the first window mesh block is less than ½ of the area of the first non-window mesh block, an area of the second mesh window-block is less than ½ of the area of the second non-window mesh block;
a length of the first conductive plate close to the window region is less than that of the second conductive plate close to the window region; and
a first width of the first conductive plate along a third direction perpendicular to an interface between the first conductive plate and the first window mesh block is greater than a second width of the second conductive plate along a fourth direction perpendicular to an interface between the second conductive plate and the second window mesh block.

In one embodiment, an area of the first non-window mesh block is substantially equal to that of the second non-window mesh block;
an area of the first window mesh block is less than ½ of the area of the first non-window mesh block, an area of the second mesh window-block is greater than ½ of the area of the second non-window mesh block; and
a first width of the first conductive plate along a third direction perpendicular to an interface between the first conductive plate and the first window mesh block is greater than a second width of the second conductive plate along a fourth direction perpendicular to an interface between the second conductive plate and the second window mesh block.

In one embodiment, the first cross-window column further includes a first conductive bridge and a second conductive bridge, and
a first end of the first conductive bridge is directly connected to a first end of the second conductive plate, and a first end of the second conductive bridge is directly connected to a second end of the second conductive plate opposite to the first end; and
the first cross-window row further includes:
a third window mesh block adjacent to the window region and on a third side of the window region opposite to the first side;

a third conductive plate directly connected to a plurality of mesh lines of the third window mesh block and extending along a third portion of the periphery of the window region; and a third conductive bridge connecting a first end of the first conductive plate and a first end of the third conductive plate together, wherein the second side is between the first side and the third side.

In one embodiment, the first conductive bridge includes a first connection portion directly connected to the first end of the second conductive plate; and a first main portion directly connected to the first connection portion, extending along a first portion of the periphery of the window region and closer to the window region than the first conductive plate;

the second conductive bridge includes a second connection portion directly connected to the second end of the second conductive plate; and a second main portion directly connected to the second connection portion, extending along the third portion of the periphery of the window region, and closer to the window region than the third conductive plate; and the third conductive bridge includes a third connection portion, a fourth connection portion, and a third main portion, wherein the third main portion is between the third connection portion and the fourth connection portion, the third connection portion and the fourth connection portion are directly connected to the first end of the first conductive plate and the first end of the third conductive plate, respectively, the third main portion is directly connected to the third connection portion and the fourth connection portion, extends along the second portion of the periphery of the window region, and is closer to the window region than the second conductive plate.

In one embodiment, the first, second, and third main portions are all fan-shaped rings; and orthographic projections of the first, second and third main portions do not overlap each other.

In one embodiment, the first conductive bridge and the second conductive bridge are in a first metal layer;

the first conductive plate, the second conductive plate, the third conductive plate, and the third conductive bridge are in a second metal layer;

the touch structure further includes a touch insulating layer between the first metal layer and the second metal layer; and the touch structure further includes first and second vias respectively extending through the touch insulating layer, the first and second conductive bridges are connected to the second conductive plate through the first and second vias, respectively.

In one embodiment, the touch structure further includes:

a first dummy plate in the second metal layer and in a floating state, wherein an orthographic projection of the first dummy plate on the touch insulating layer is between an orthographic projection of the first conductive plate on the touch insulating layer and an orthographic projection of the first conductive bridge on the touch insulating layer; and a second dummy plate in the second metal layer and in a floating state, wherein an orthographic projection of the second dummy plate on the touch insulating layer is between an orthographic projection of the second conductive plate on the touch insulating layer and an orthographic projection of the third conductive bridge on the touch insulating layer.

In one embodiment, a width of the first dummy plate in the third direction is less than a width of the second dummy plate in the fourth direction.

In one embodiment, the first cross-window column further includes:

a fourth window mesh block adjacent to the window region and on a fourth side of the window region opposite to the second side; and a fourth conductive structure connected to the fourth window mesh block, wherein a first end of the fourth conductive structure is connected to a second end of the first conductive bridge, and a second end of the fourth conductive structure is connected to a second end of the second conductive bridge.

In one embodiment, the fourth window mesh block includes a first window mesh sub-block, at least one second window mesh sub-block, and at least one third window mesh sub-block, the first window mesh sub-block is between the at least one second window mesh sub-block and the at least one third window mesh sub-block along the periphery of the window region, the at least one second window mesh sub-block is closer to the first window mesh block than the first window mesh sub-block, the at least one third window mesh sub-block is closer to the third window mesh block than the first window mesh sub-block;

the fourth conductive structure includes a first conductive sub-plate, at least one second conductive sub-plate, at least one third conductive sub-plate, a sixth conductive bridge and a seventh conductive bridge;

the first conductive sub-plate is directly connected to a plurality of mesh lines of the first window mesh sub-block and extends along a fourth portion of the periphery of the window region;

the at least one second conductive sub-plate is one-to-one correspondence with the at least one second window mesh sub-block and is directly connected to a plurality of mesh lines of the at least one second window mesh sub-block, respectively, and extends along the fourth portion of the periphery of the window region;

the at least one third conductive sub-plate is one-to-one correspondence with the at least one third window mesh sub-block and is directly connected to a plurality of mesh lines of the at least one third window mesh sub-block, respectively, and extends along the fourth portion of the periphery of the window region;

a first end of the first conductive sub-plate is connected to a first end of a nearest second conductive sub-plate, which is closest to the first conductive sub-plate, of the at least one second conductive sub-plate, and a second end of the first conductive sub-plate is connected to a first end of a nearest third conductive sub-plate, which is closest to the first conductive sub-plate, of the at least one third conductive sub-plate;

a second end of the farthest second conductive sub-plate, which is farthest from the first conductive sub-plate, of the at least one second conductive sub-plate is connected to the first conductive bridge through the sixth conductive bridge;

a second end of the farthest third conductive sub-plate, which is farthest from the first conductive sub-plate, of the at least one third conductive sub-plate is connected to the second conductive bridge through the seventh conductive bridge;

the at least one second conductive sub-plate is sequentially connected between the first end of the first conductive sub-plate and the sixth conductive bridge through the nearest second conductive sub-plate and the farthest second conductive sub-plate; and the at least one third conductive sub-plate is sequentially connected between the second end of the first conductive sub-plate and the seventh conductive bridge through the nearest third conductive sub-plate and the farthest third conductive sub-plate.

In one embodiment, the at least one second window mesh sub-block includes two second window mesh sub-blocks which are sequentially arranged between the first window mesh sub-block and the first window mesh block and include a nearest second window mesh sub-block adjacent to the first window mesh sub-block and a farthest second window mesh sub-block adjacent to the first window mesh block;

the at least one second conductive sub-plate includes two second conductive sub-plates, wherein the farthest second conductive sub-plate is directly connected to a plurality of mesh lines of the farthest second window mesh sub-block;

the at least one third window mesh sub-block includes three third window mesh sub-blocks which are sequentially arranged between the first window mesh sub-block and the third window mesh sub-block and include a nearest third window mesh sub-block adjacent to the first window mesh sub-block and a farthest third window mesh sub-block adjacent to the third window mesh block; and the at least one third conductive sub-plate includes three third conductive sub-plates, wherein the farthest third conductive sub-plate is directly connected to a plurality of mesh lines of the farthest third window mesh sub-block.

In one embodiment, the fourth conductive structure further includes:

a fourth conductive bridge having a first end directly connected to the first end of the first conductive sub-plate; and a fifth conductive bridge having a first end directly connected to the second end of the first conductive sub-plate;

a first end of the nearest third conductive sub-plate is connected to a second end of the fifth conductive bridge, and a first end of the nearest second conductive sub-plate is connected to a second end of the fourth conductive bridge.

In one embodiment, a first end of the sixth conductive bridge is directly connected to a second end of the farthest second conductive sub-plate;

a first end of the seventh conductive bridge is directly connected to a second end of the farthest third conductive sub-plate;

the touch structure further includes a third via and a fourth via respectively extending through the touch insulating layer;

a second end of the sixth conductive bridge is directly connected to the second end of the first conductive bridge through the third via; and a second end of the seventh conductive bridge is directly connected to the second end of the second conductive bridge through the fourth via.

In one embodiment, an orthographic projection of the third via on the touch insulating layer overlaps an orthographic projection of the second end of the first conductive bridge on the touch insulating layer;

an orthographic projection of the fourth via on the touch insulating layer overlaps an orthographic projection of the second end of the second conductive bridge on the touch insulating layer; and the sixth and seventh conductive bridges are in the second metal layer.

In one embodiment, the touch structure further includes: a third auxiliary conductive bridge including a first auxiliary connection portion, a second auxiliary connection portion, and a first auxiliary main portion, wherein the first auxiliary main portion is connected between the first and second auxiliary connection portions, extends along the fourth portion of the window region and is closer to the window region than the fourth conductive structure;

wherein the touch structure further includes a fifth via and a sixth via respectively extending through the touch insulating layer, a first end of the first auxiliary connection portion is directly connected to a second end of the first conductive plate through the fifth via, and a second end of the first auxiliary connection portion is directly connected to a first end of the first auxiliary main portion; and a first end of the second auxiliary connection portion is directly connected to a second end of the third conductive plate through the sixth via, and a second end of the second auxiliary connection portion is directly connected to a second end of the first auxiliary main portion; and the third auxiliary conductive bridge is in the first metal layer.

In one embodiment, the touch structure further includes a third via and a fourth via respectively extending through the touch insulating layer; a first end of the sixth conductive bridge is connected to a second end of the farthest second conductive sub-plate through the third via;

a first end of the seventh conductive bridge is connected to a second end of the farthest third conductive sub-plate through the fourth via;

a second end of the sixth conductive bridge is connected to the second end of the first conductive bridge; and a second end of the seventh conductive bridge is connected to the second end of the second conductive bridge.

In one embodiment, an orthographic projection of the third via on the touch insulating layer overlaps an orthographic projection of the second end of the farthest second conductive sub-plate on the touch insulating layer;

an orthographic projection of the fourth via on the touch insulating layer overlaps an orthographic projection of the second end of the farthest third conductive sub-plate on the touch insulating layer; and the sixth and seventh conductive bridges are in the first metal layer.

In one embodiment, the touch structure further includes: a third auxiliary conductive bridge including a first auxiliary connection portion, a second auxiliary connection portion, and a first auxiliary main portion, wherein the first auxiliary main portion is connected between the first auxiliary connection portion and the second auxiliary connection portion, extends along the fourth portion of the window region and is closer to the window region than the fourth conductive structure;

wherein a first end of the first auxiliary connection portion is directly connected to a second end of the first conductive plate, a second end of the first auxiliary connection portion is directly connected to a first end of the first auxiliary main portion, a first end of the second auxiliary connection portion is directly connected to a second end of the third conductive plate, and a second end of the second auxiliary connection portion is directly connected to the second end of the third conductive plate; and the third auxiliary conductive bridge is in the second metal layer.

In one embodiment, a length of each of the at least one second conductive sub-plate and the at least one third conductive sub-plate extending along the periphery of the window region is less than a length of the first conductive sub-plate extending along the periphery of the window region;

the first conductive sub-plate, the at least one second conductive sub-plate and the at least one third conductive sub-plate are fan-shaped rings; and a width of each of the at least one second conductive sub-plate along a direction perpendicular to an interface between the second conductive sub-plate and a corresponding second window mesh sub-block and a width of each of the at least one third conductive sub-plate along a direction perpendicular to an interface between the third conductive sub-plate and a corresponding third window mesh sub-block are all less than a third width of the first conductive sub-plate along a direction perpendicular to an interface between the first conductive sub-plate and the first window mesh sub-block.

In one embodiment, the at least one second window mesh sub-block and the at least one third window mesh sub-block are finger-shaped mesh sub-blocks; and the width of each of the at least one second conductive sub-plate along the direction perpendicular to the interface between the second conductive sub-plate and the corresponding second window mesh sub-block is substantially equal to the width of each of the at least one third conductive sub-plate along the direction perpendicular to the interface between the third conductive sub-plate and the corresponding third window mesh sub-block.

In one embodiment, the fourth conductive structure further includes at least one auxiliary conductive sub-plate, which is not directly connected to mesh lines of the plurality of first mesh electrodes and the plurality of second mesh electrodes, extends along the fourth portion of the periphery of the window region, respectively, and is connected between the farthest third conductive sub-plate and the seventh conductive bridge and/or between the farthest second conductive sub-plate and the sixth conductive bridge, for assisting the first conductive sub-plate, the at least one second conductive sub-plate, and the at least one third conductive sub-plate in compensating for a missing area of the fourth window mesh block with respect to the second non-window mesh block.

In one embodiment, the at least one cross-window row further includes a second cross-window row adjacent to the first cross-window row, the second cross-window row includes:

a fifth window mesh block adjacent to the window region and between the first mesh window sub-block and the first window mesh block, including at least one fifth window mesh sub-block, wherein the at least one fifth window mesh sub-block and the at least one second window mesh sub-block are arranged alternately on the fourth side of the window region;

at least one fifth conductive sub-plate directly connected to a plurality of mesh lines of the at least one fifth window mesh sub-block, respectively, wherein the at least one fifth conductive sub-plate and the at least one second conductive sub-plate extend along the fourth portion of the periphery of the window region alternately;

a sixth window mesh block adjacent to the window region and between the first mesh window sub-block and the third window mesh block, including at least one sixth window mesh sub-block, wherein the at least one sixth window mesh sub-block and the at least one third window mesh sub-block are arranged alternately on the fourth side of the window region; and at least one sixth conductive sub-plate directly connected to a plurality of mesh lines of the at least one sixth window mesh sub-block, respectively, wherein the at least one sixth conductive sub-plate and the at least one third conductive sub-plate extend along the fourth portion of the periphery of the window region alternately; and the fifth window mesh block and the sixth window mesh block are directly connected to each other on a side of the window region away from the first cross-window row.

In one embodiment, the at least one cross-window row further includes a second cross-window row adjacent to the first cross-window row, the second cross-window row includes:

a fifth window mesh block adjacent to the window region and between the first mesh window sub-block and the first window mesh block, including at least one fifth window mesh sub-block, wherein the at least one fifth window mesh sub-block and the at least one second window mesh sub-block are arranged alternately on the fourth side of the window region;

at least one fifth conductive sub-plate directly connected to a plurality of mesh lines of the at least one fifth window mesh sub-block, respectively, wherein the at least one fifth conductive sub-plate and the at least one second conductive sub-plate extend along the fourth portion of the periphery of the window region alternately;

a sixth window mesh block adjacent to the window region and between the first mesh window sub-block and the third window mesh block, including at least one sixth window mesh sub-block; and the at least one sixth conductive sub-plate directly connected to mesh lines of the at least one sixth window mesh sub-block, respectively;

wherein the at least one auxiliary conductive sub-plate extends along the fourth portion of the periphery of the window region and is connected between the farthest third conductive sub-plate and the seventh conductive bridge, respectively;

a combination of the at least one auxiliary conductive sub-block and the at least one third conductive sub-block, and the at least one sixth conductive sub-block extend along the fourth portion of the periphery of the window region alternately; and the fifth window mesh block and the sixth window mesh block are directly connected to each other on a side of the window region away from the first cross-window row.

In one embodiment, the at least one fifth window mesh sub-block and the at least one sixth window mesh sub-block are both finger-shaped mesh blocks;

the at least one fifth conductive sub-plate and the at least one sixth conductive sub-plate are fan-shaped rings; and a width of each of the at least one fifth conductive sub-plate along a direction perpendicular to an interface between the fifth conductive sub-plate and a corresponding fifth window mesh sub-block is substantially equal to a width of each of the at least one sixth conductive sub-plate along a direction perpendicular to an interface between the sixth conductive sub-plate and a corresponding sixth window mesh sub-block.

In one embodiment, the at least one fifth conductive sub-plate and the at least one sixth conductive sub-plate are in the second metal layer.

In one embodiment, the fourth conductive bridge includes a fourth main portion extending along the fourth portion of the periphery of the window region and on a side, which is away from a corresponding fifth window mesh sub-block, of a nearest fifth conductive sub-plate of the at least one fifth conductive sub-plate that is closest to the first conductive sub-plate, the touch structure further includes a fifth dummy plate between the fourth main portion and the nearest fifth conductive sub-plate, wherein the fifth dummy plate is floating; and/or the fifth conductive bridge includes a fifth main portion extending along the fourth portion of the periphery of the window region and on a side, which is away from a corresponding sixth window mesh sub-block, of a nearest sixth conductive sub-plate of the at least one sixth conductive sub-plate that is closest to the first conductive sub-plate, the touch structure further includes a sixth dummy plate between the fifth main portion and the nearest sixth conductive sub-plate, wherein the sixth dummy plate is floating.

In one embodiment, the fourth conductive structure further includes at least one first intermediate connection structure connected respectively between every two adjacent second conductive sub-plates of the at least one second conductive sub-plate, and respectively including a first intermediate main portion on a side, which is close to the window region, of a fifth conductive sub-plate other than the nearest fifth conductive sub-plate of the at least one fifth conductive sub-plate, the touch structure further includes at least one seventh dummy plate between the first intermediate main portion and a corresponding fifth conductive sub-plate, and the at least one seventh dummy plate is floating; and the fourth conductive structure further includes at least one second intermediate connection structure connected respectively between every two adjacent third conductive sub-plates of the at least one third conductive sub-plate, and respectively including a second intermediate main portion on a side, which is close to the window region, of a sixth conductive sub-plate other than the nearest sixth conductive sub-plate of the at least one sixth conductive sub-plate, the touch structure further includes at least one eleventh dummy plate between the second intermediate main portion and a corresponding fifth conductive sub-plate, and the at least one eleventh dummy plate is floating.

In one embodiment, the fourth conductive structure further includes at least one third intermediate connection structure connected respectively between a farthest third conductive sub-plate of the at least one third conductive sub-plate and a nearest auxiliary conductive sub-plate of the at least one auxiliary conductive sub-plate, which is closest to the first conductive sub-plate, and between two adjacent auxiliary conductive sub-plates of the at least one auxiliary conductive sub-plate, and respectively including a third intermediate main portion on a side, which is close to the window region, of a sixth conductive sub-plate other than a sixth conductive sub-plate corresponding to the at least one third conductive sub-plate of the at least one sixth conductive sub-plate, the touch structure further includes at least one twelfth dummy plate between the third intermediate main portion and a corresponding sixth conductive sub-plate, and the at least one twelfth dummy plate is floating.

In one embodiment, the touch structure further includes:
a protection ring on a side of the first, second, third, fourth, fifth, and sixth window mesh blocks close to the window region,
wherein the protection ring extends around the periphery of the window region, and is a circular ring or a circular ring with a cutout.

In one embodiment, the touch structure further includes:
at least one eighth dummy plate in a floating state, wherein an orthographic projection of the at least one eighth dummy plate on the touch insulating layer is respectively located between an orthographic projection of the at least one second conductive sub-plate on the touch insulating layer and an orthographic projection of the protection ring on the touch insulating layer;
at least one ninth dummy plate in a floating state, wherein an orthographic projection of the at least one ninth dummy plate on the touch insulating layer is respectively located between an orthographic projection of the at least one third conductive sub-plate on the touch insulating layer and the orthographic projection of the protection ring on the touch insulating layer.

In one embodiment, the touch structure further includes:
a protection ring on a side of the first, second, third, fourth, fifth, and sixth window mesh blocks close to the window region, wherein the protection ring extends around the periphery of the window region, and is a circular ring or a circular ring with a cutout; and
at least one tenth dummy plate in a floating state, wherein an orthographic projection of the at least one tenth dummy plate on the touch insulating layer is respectively located between an orthographic projection of the at least one auxiliary conductive sub-plate on the touch insulating layer and an orthographic projection of the protection ring on the touch insulating layer.

In one embodiment, the protection ring is in the first metal layer.

In one embodiment, the first metal layer is made of a first material;
the second metal layer is made of a second material; and
the first material has a resistance greater than that of the second material.

In one embodiment, orthographic projections of the first dummy plate, the second dummy plate, the fifth dummy plate, the sixth dummy plate, the at least one eighth dummy plate and the at least one ninth dummy plate, the first conductive plate, the second conductive plate, the third conductive plate, the first conductive sub-plate, the at least one second conductive sub-plate, the at least one third conductive sub-plate, the at least one fifth conductive sub-plate, the at least one sixth conductive sub-plate, the third conductive bridge, the fourth conductive bridge, the fifth conductive bridge, the six conductive bridge, the seventh conductive bridge, the first conductive bridge and the second conductive bridge, the at least one first intermediate connection structure and the at least one second intermediate connection structure on the touch insulating layer do not overlap each other; and the orthographic projections of the first dummy plate, the second dummy plate, the fifth dummy plate, the sixth dummy plate, the at least one eighth dummy plate and the at least one ninth dummy plate, the first conductive plate, the second conductive plate, the third conductive plate, the first conductive sub-plate, the at least one second conductive sub-plate, the at least one third conductive sub-plate, the at least one fifth conductive sub-plate, the at least one sixth conductive sub-plate, the third conductive bridge, the fourth conductive bridge, the fifth conductive bridge, the six conductive bridge, the seventh conductive bridge, the at least one first intermediate connection structure and the at least one second intermediate connection structure, the first conductive bridge and the second conductive bridge on the touch insulating layer are a plurality of fan-shaped rings having a same circle center.

In one embodiment, an orthographic projection of the circle center of the plurality of fan-shaped rings on the touch insulating layer TI coincides with an orthographic projection of a circle center of the protection ring PR on the touch insulating layer TI.

The present disclosure further provides a display panel, which includes the above touch structure and a hole in the window region;
wherein no display elements of the display panel are present in the window region; the display panel is configured to display an image in at least a portion of the touch region; and
the display panel further includes an accessory mounted in the window region.

BRIEF DESCRIPTION OF DRAWINGS

The following drawings are merely examples for illustrative purposes according to various disclosed embodiments and are not intended to limit the scope of the invention.

DETAIL DESCRIPTION OF EMBODIMENTS

Figure 1:
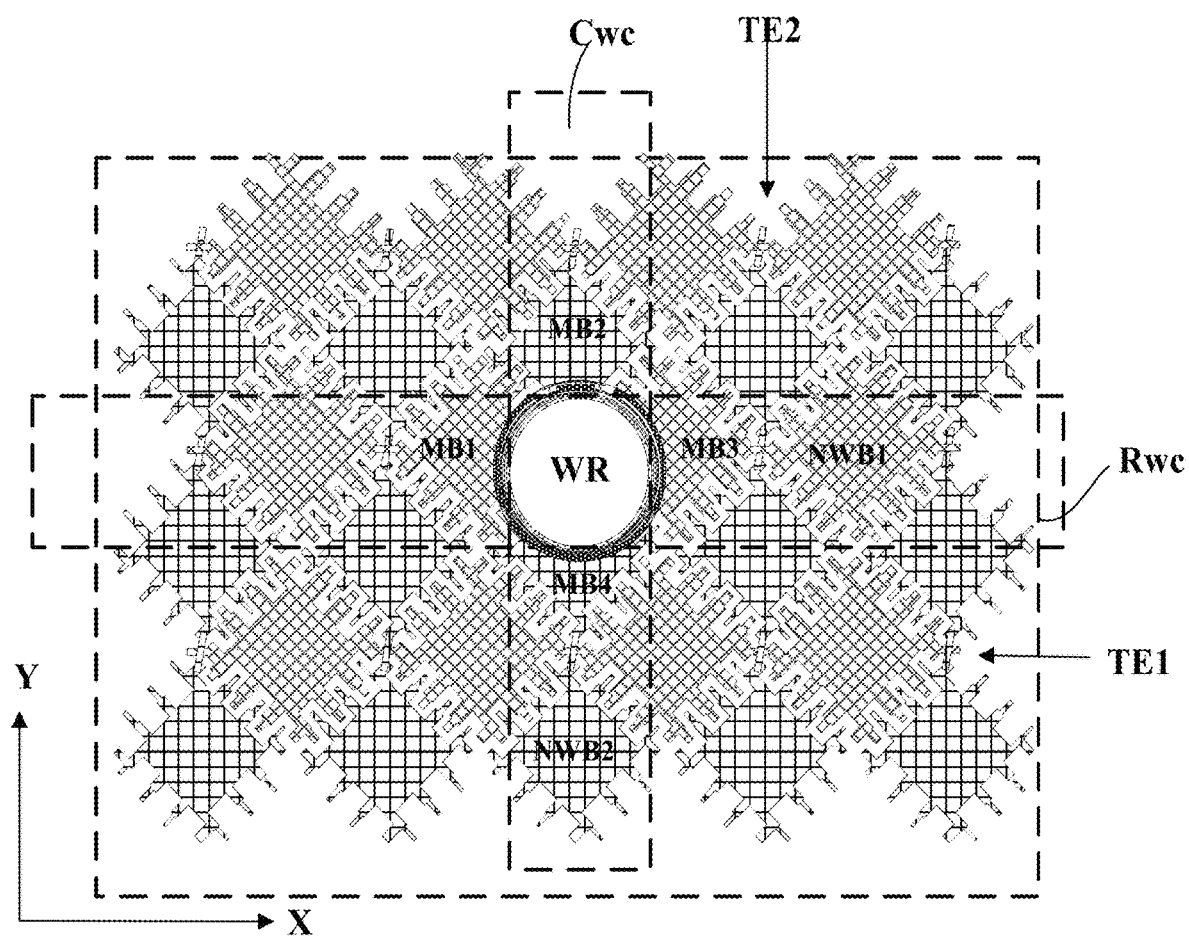
FIG. 1 is a schematic diagram illustrating a touch structure in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

With the development of science and technology, a display screen of a smart phone changes with each passing day. At present, the placement of a front camera in a display region (an AA hole region) becomes a mainstream design. Meanwhile, people have higher and higher requirements on a touch function and the AA hole region. However, a touch performance is inevitably decreases in the AA hole region due to an absence of touch patterns in the AA hole region, and the touch patterns in the AA hole region needs to be compensated but cannot be over-compensated. In addition, a region around the AA hole region is not flat enough due to leveling of an encapsulation layer below a touch layer, so that a risk of bridge breaking exists when a single bridge is connected, which causes a whole channel to be broken, and causes a path for transmitting touch signals to be broken. Therefore, the biggest difficult problems of the existing touch display screen is: how to design a bridge-crossing scheme for the AA hole region, to compensate, rather than over-compensating, a capacitance and to reduce the risk of bridge breaking.

The present disclosure provides, inter alia, a touch structure and a display panel that substantially obviate one or more of the problems due to limitations and disadvantages of the related art. In one aspect, the present disclosure provides a touch structure. In some embodiments, a touch structure is provided, including: a plurality of first mesh electrodes extending in a first direction and a plurality of second mesh electrodes extending in a second direction intersecting the first direction, wherein the touch structure is defined in a touch region and is absent in a window region surrounded by the touch region; wherein the plurality of first mesh electrodes include at least one cross-window row separated by the window region, the at least one cross-window row includes a first cross-window row and the first cross-window row includes: a first window mesh block adjacent to the window region and on a first side of the window region; a first conductive plate directly connected to a plurality of mesh lines of the first window mesh block; and a first non-window mesh block on a side of the first window mesh block away from the window region; wherein the plurality of second mesh electrodes include at least one cross-window column separated by the window region, the at least one cross-window column includes a first cross-window column and the first cross-window column includes: a second window mesh block adjacent to the window region and on a second side of the window region; a second conductive plate directly connected to a plurality of mesh lines of the second window mesh block; and a second non-window mesh block on a side of the second window mesh block away from the window region; wherein the first and second conductive plates extend along first and second portions of a periphery of the window region, respectively; an area of the first conductive plate is positively correlated to that of a missing portion of the first window mesh block with respect to the first non-window mesh block, and an area of the second conductive plate is positively correlated to that of a missing portion of the second window mesh block with respect to the second non-window mesh block.

Optionally, the first direction is a row direction, the second direction is a column direction, and the row direction and the column direction intersect with each other. Optionally, the row direction and the column direction are perpendicular to each other.

Each first mesh electrode and each second mesh electrode are formed by a plurality of mesh lines, and each mesh line has a line width in a range of 1 µm to 50 µm, such as 4 µm. Therefore, it is particularly difficult to connecting adjacent window mesh blocks together through mesh lines, which often results in a poor connection. The present disclosure avoids problems in a related touch structure by adopting a novel and advantageous design for touch electrodes.

FIG. 1 is a schematic diagram illustrating a touch structure in some embodiments according to the present disclosure. Referring to FIG. 1, in some embodiments, a touch structure includes a plurality of first mesh electrodes TE1 (Rx channels, i.e., receiving electrode channels) and a plurality of second mesh electrodes TE2 (Tx channels, i.e., transmitting electrode channels). Optionally, the touch structure is a mutual capacitance touch structure. Optionally, the plurality of first mesh electrodes TE1 are a plurality of touch scanning electrodes, and the plurality of second mesh electrodes TE2 are a plurality of touch sensing electrodes. Optionally, the plurality of first mesh electrodes TE1 are a plurality of touch sensing electrodes, and the plurality of second mesh electrodes TE2 are a plurality of touch scanning electrodes. The touch structure is defined in a touch region TCR and is absent in a window region WR surrounded by the touch region TCR. For example, the touch structure may be a touch structure in a display panel, where the touch region TCR substantially overlaps a display region of the display panel, and the window region WR is a region of the display panel having a hole in which an accessory is mounted, such as a camera lens or a fingerprint sensor. The display panel is configured to display an image in at least a portion of the touch region TCR. In one example, in the window region WR, display elements and the touch structure of the display panel are absent; in at least a portion of the display region or the touch region TCR, display elements and the touch structure of the display panel are present.

Referring to FIG. 1, in some embodiments, the plurality of first mesh electrodes TE1 are arranged in a plurality of rows, each first mesh electrode TE1 is one of the plurality of first mesh electrodes TE1; the plurality of second mesh electrodes TE2 are arranged in a plurality of columns, each of the second mesh electrodes TE2 is one of the plurality of second mesh electrodes TE2. In some embodiments, at least one row of the plurality of rows of first mesh electrodes TE1 crosses over the window region WR. For example, as shown in FIG. 1, a cross-window row Rwc of the plurality of first mesh electrodes TE1 crosses over the window region WR. The first mesh electrodes TE1 in the cross-window row Rwc is divided into two portions (a portion on the left side of the window region WR and a portion on the right side of the window region WR) by the window region WR. In some embodiments, at least one column of the plurality of columns of second mesh electrodes TE2 crosses over the window region WR. For example, as shown in FIG. 1, a cross-window column Cwc of the plurality of second mesh electrodes TE2 crosses over the window region WR. The second mesh electrodes TE2 in the cross-window column Cwc is divided into two portions (a portion on the upper side of the window region WR and a portion on the lower side of the window region WR) by the window region WR.

Figure 2:
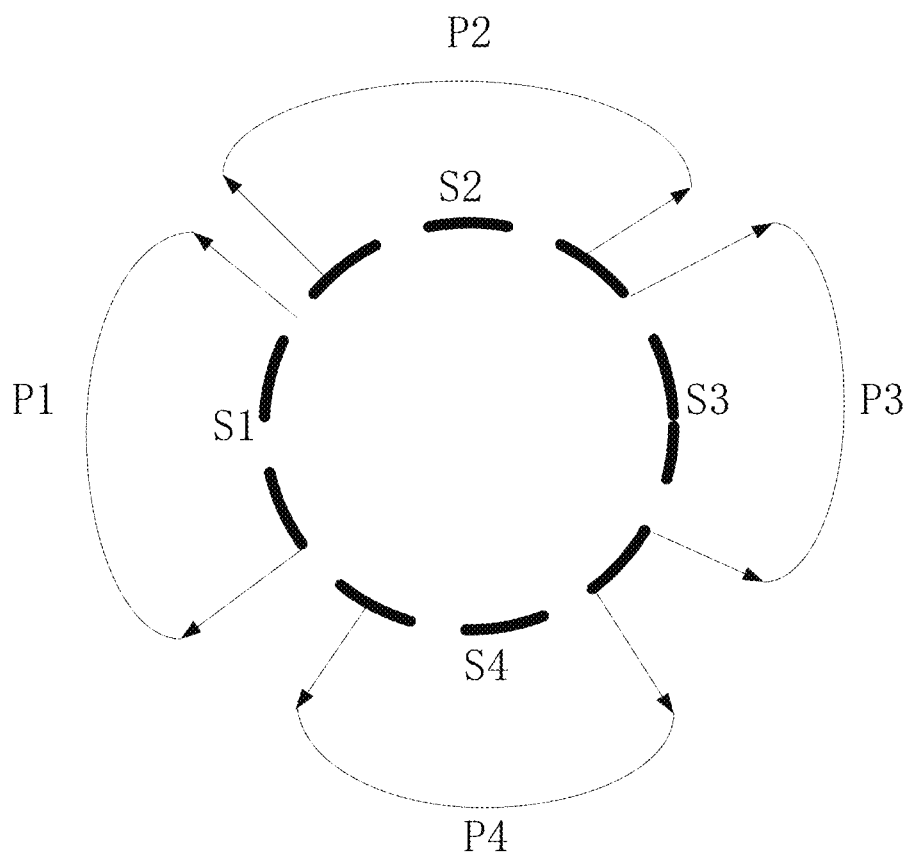
FIG. 2 is a schematic diagram illustrating a window region in some embodiments according to the present disclosure.
Figure 3:
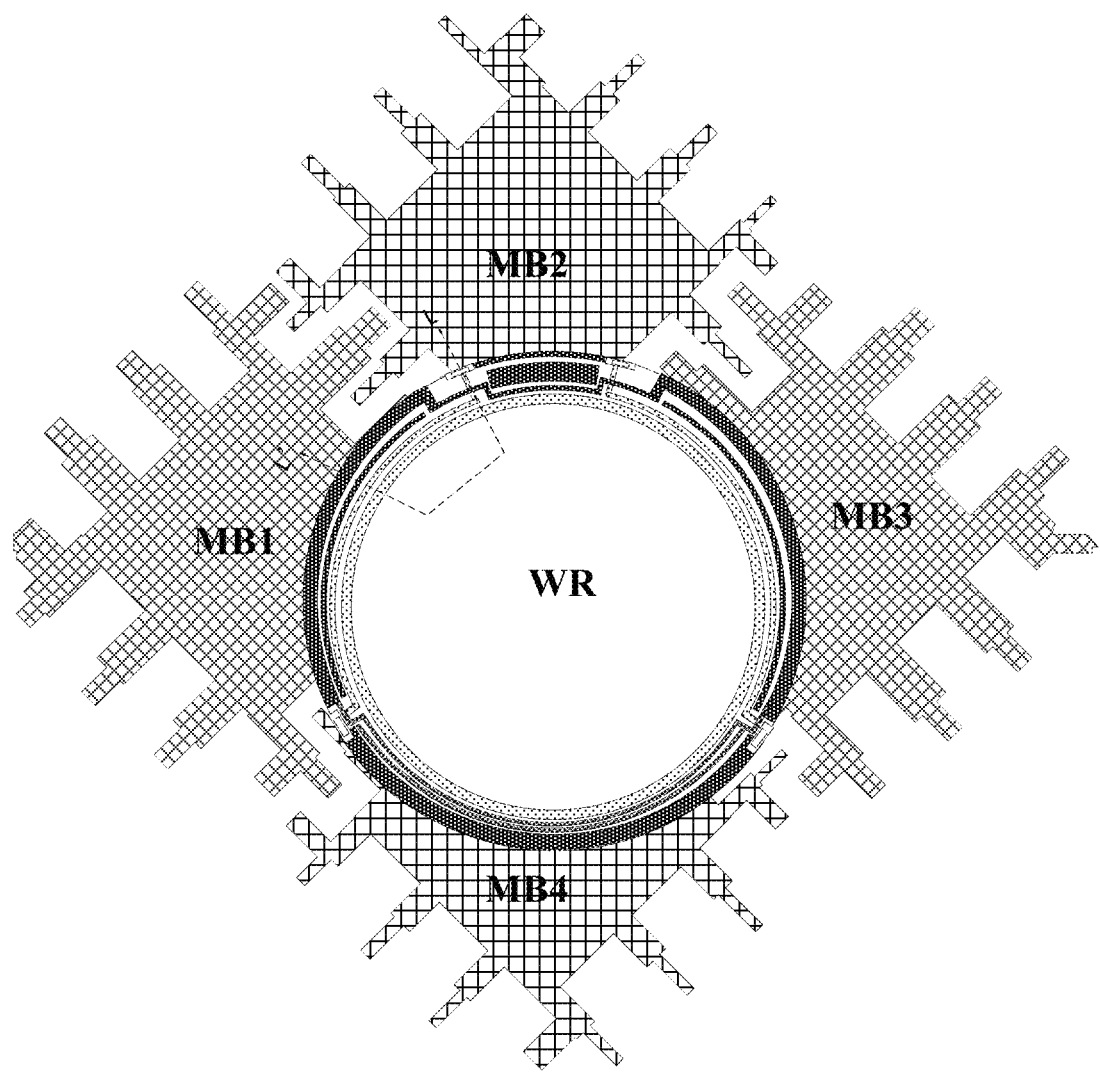
FIG. 3 is an enlarged view showing a touch structure surrounding a window region in some embodiments according to the present disclosure.
Figure 4A:
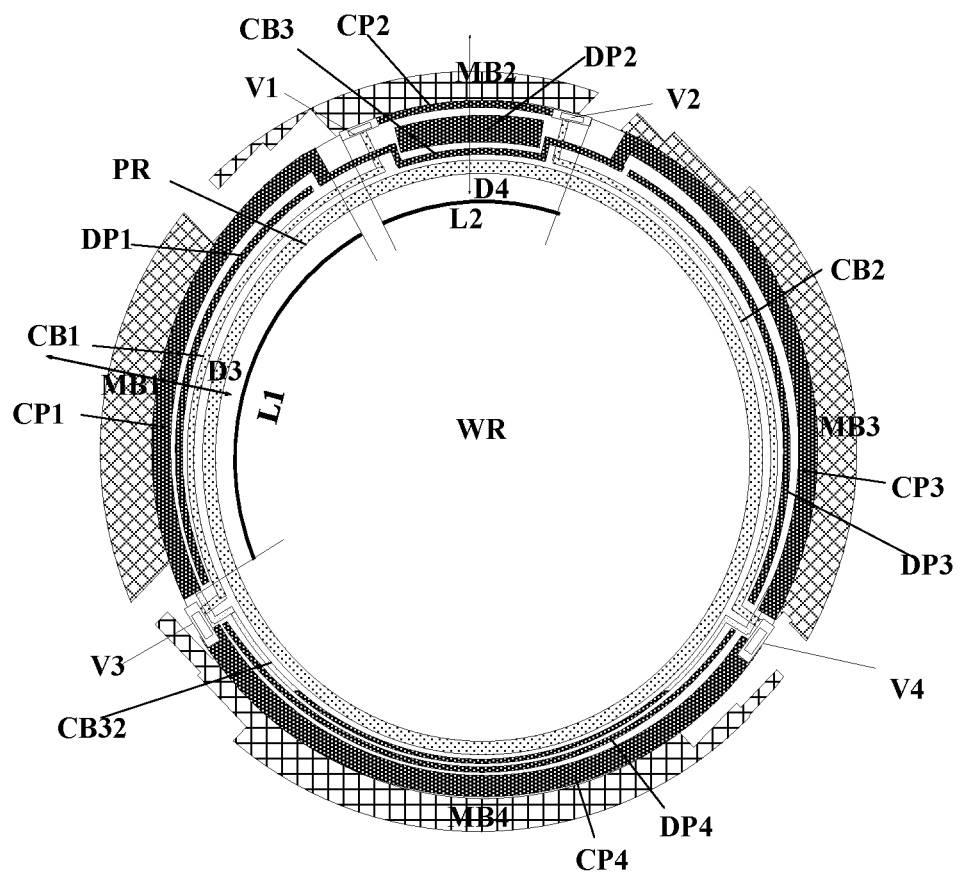
FIG. 4A is a further enlarged view of a touch structure surrounding a window region in some embodiments according to the present disclosure.

FIG. 2 is a schematic diagram illustrating a window region in some embodiments according to the present disclosure; FIG. 3 is an enlarged view showing a touch structure surrounding a window region in some embodiments according to the present disclosure; FIG. 4A is a further enlarged view of a touch structure surrounding a window region in some embodiments according to the present disclosure. Referring to FIG. 2, in some embodiments, the window region WR generally has at least four sides, including a first side S1, a second side S2, a third side S3, and a fourth side S4. Referring to FIGS. 2 to 4A, in some embodiments, the cross-window row Rwc of the plurality of first mesh electrodes TE1 includes a first window mesh block MB1 and a third window mesh block MB3 located at the first and third sides S1 and S3 of the window region WR, respectively; a first conductive plate CP1 directly connected to the plurality of mesh lines of the first window mesh block MB1; a third conductive plate CP3 directly connected to the plurality of mesh lines of the third window mesh block MB3; and a third conductive bridge CB3 connecting the first conductive plate CP1 and the third conductive plate CP3. Referring to FIGS. 2 to 4A, in some embodiments, the cross-window column Cwc of the plurality of second mesh electrodes TE2 includes a second window mesh block MB2 and a fourth window mesh block MB4 located at the second side S2 and the fourth side S4 of the window region WR, respectively; a second conductive plate CP2 directly connected to the plurality of mesh lines of the second window mesh block MB2; a fourth conductive plate CP4 directly connected to the plurality of mesh lines of the fourth window mesh block MB4; and a first conductive bridge CB1 connecting the second conductive plate CP2 and the fourth conductive plate CP4.

In the present touch structure, adjacent window mesh blocks (e.g., the first window mesh block MB1 and the third window mesh block MB3) in the same row separated by the window region WR are connected to each other through a conductive connection bridge (e.g., the third conductive bridge CB3) by means of conductive plates (e.g., the first conductive plate CP1 and the third conductive plate CP3); adjacent window mesh blocks (e.g., the second window mesh block MB2 and the fourth window mesh block MB4) in the same column separated by the window region WR are connected to each other through a conductive connection bridge (e.g., the first conductive bridge CB1) by means of conductive plates (e.g., the second conductive plate CP2 and the fourth conductive plate CP4).

Referring to FIGS. 2 and 4A, the first, second, third and fourth conductive plates CP1, CP2, CP3 and CP4 extend around first, second, third and fourth portions P1, P2, P3 and P4, respectively, of the periphery of the window region WR; and the first and third conductive bridges CB1 and CB3 extend around the first and third portions P1 and P3 of the window region WR, respectively.

Referring to FIG. 1, the touch structure of the present disclosure further includes first non-window mesh blocks NWB1 and second non-window mesh blocks NWB2. Patterns of a plurality of mesh lines of the first and second non-window mesh blocks NWB1 and NWB2 are not missing regardless of the existence of the window region WR, i.e., the first non-window mesh blocks NWB1 are located on a side of the first window mesh block MB1 and the third window mesh block MB3 away from the window region WR, respectively; and the second non-window mesh blocks NWB2 are located on a side of the second window mesh block MB2 and the fourth window mesh block MB4 away from the window region WR, respectively. An area of each first non-window mesh block NWB1 and an area of each second non-window mesh block NWB2 are generally equal to each other. As shown in FIG. 1, in this embodiment, each of the first and second non-window mesh blocks NWB1 and NWB2 mainly includes a sheet-like mesh sub-block in the middle and a plurality of finger-shaped mesh sub-blocks disposed around the sheet-like mesh sub-block. Due to the presence of the window region WR, the mesh lines of the first window mesh block MB1, the second window mesh block MB2, the third window mesh block MB3, and the fourth window mesh block MB4 will be missing. A compensation mechanism for the touch structure at the periphery of the window region WR is provided in the present disclosure, to compensate for the missing (lack) of the patterns of these window mesh blocks and to establish touch signal transmission paths in the row direction and the column direction of the window region WR.

The window region WR is provided at different positions and has different sizes, which occupies different mesh blocks, and therefore, patterns of the mesh lines of the window mesh blocks adjacent to the window region are also different.

As shown in FIG. 1, in this embodiment, the window region WR is inside the adjacent four mesh blocks, the window region WR occupies only one row of the first mesh electrode TE1 and one column of the second mesh electrode TE2. That is, for the window region WR, the cross-window row Rwc exists only in one row of the first mesh electrode TE1, and the cross-window column Cwc exists only in one column of the second mesh electrode TE2. In this case, the mesh lines of each of the window mesh blocks adjacent to the window region WR belong to a part of the sheet-like mesh sub-block in the middle, not a part of the finger-shaped mesh sub-block at the outer edge.

Further, as shown in FIGS. 2 to 4A, the first conductive plate CP1 is configured to be connected to the first window mesh block MB1, and the second conductive plate CP2 is configured to be connected to the second mesh block MB2. As shown in FIGS. 3 and 4A, the first conductive plate CP1 is directly connected to the plurality of mesh lines of the first window mesh block MB1, and the second conductive plate CP2 is directly connected to the plurality of mesh lines of the second window mesh block MB2. A length L1 of the first conductive plate CP1 extending along the periphery of the window region WR is greater than a length L2 of the second conductive plate CP2 extending along the periphery of the window region WR. In the case where the respective window mesh block units of the first and second mesh electrodes TE1 and TE2 are substantially the same, as shown, it is necessary for the first conductive plate CP1 to compensate for the missing of more mesh lines, and thus, an area of the first conductive plate CP1 should be greater than that of the second conductive plate CP2. As shown in FIGS. 2A to 4, when the first conductive plate CP1 and the second conductive plate CP2 are both arc-shaped structures (e.g., fan-shaped rings (sector rings)), the first window mesh block MB1 has an area greater than ½ of the area of the first non-window mesh block NWB1, and the second mesh window block MB2 has an area greater than ½ of the area of the second non-window mesh block NWB2, a width of the first conductive plate CP1 along a direction perpendicular to an interface between the first conductive plate CP1 and the first window mesh block MB1 may be set to be greater than a width of the second conductive plate CP2 along a direction perpendicular to an interface between the second conductive plate CP2 and the second window mesh block MB2. In this way, a self-capacitance of a mesh block missing patterns of the more mesh lines is compensated by a conductive plate having a greater size. When the first and second conductive plates CP1 and CP2 are fan-shaped rings, the length L1 of the first conductive plate CP1 extending along the periphery of the window region WR may be equal to a length of the first conductive plate CP1 on a side close to the window region WR, and the length L2 of the second conductive plate CP2 extending along the periphery of the window region WR may also be equal to a length of the second conductive plate CP2 on a side close to the window region WR.

In one embodiment, when the area of the first window mesh block is less than ½ of the area of the first non-window mesh block and the area of the second mesh window block is less than ½ of the area of the second non-window mesh block; and when the length of the first conductive plate on the side close to the window region is less than the length of the second conductive plate on the side close to the window region, the first window mesh block lacks more metal mesh patterns than the first non-window mesh block, so that the width of the first conductive plate along the direction perpendicular to the interface between the first conductive plate and the first window mesh block may be set to be greater than the width of the second conductive plate along the direction perpendicular to the interface between the second conductive plate and the second window mesh block.

In one embodiment, when the area of the first window mesh block is less than ½ of the area of the first non-window mesh block and the area of the second mesh window block is greater than ½ of the area of the second non-window mesh block, the first window mesh block lacks more metal mesh patterns than the non-window mesh block, so that the width of the first conductive plate along the direction perpendicular to the interface between the first conductive plate and the first window mesh block may be set to be greater than the width of the second conductive plate along the direction perpendicular to the interface between the second conductive plate and the second window mesh block.

Further, as shown in FIGS. 3 and 4A, the touch structure of the embodiment of the present disclosure further includes a second conductive bridge CB2 connecting a first end of the second conductive plate CP2 to a first end of the fourth conductive plate CP4. That is, the first end of the second conductive plate CP2 is connected to one end of the first conductive bridge CB1, and the second end of the second conductive plate CP2 is connected to the first end of the second conductive bridge CB2. The second conductive plate CP2 is connected to the fourth conductive plate CP4 by both the first conductive bridge CB1 and the second conductive bridge CB2, thereby employing a two-channel structure formed by two conductive bridges in the cross-window column Cwc to reduce the risk of open circuits. In addition, as shown in FIGS. 3 and 4A, the touch structure of the embodiment of the present disclosure further includes a third auxiliary conductive bridge CB32, which directly connects the first conductive plate CP1 and the third conductive plate CP3 together, thereby employing a two-channel structure formed by two conductive bridges in the cross-window row Rwc to reduce the risk of open circuits.

Figure 4B:
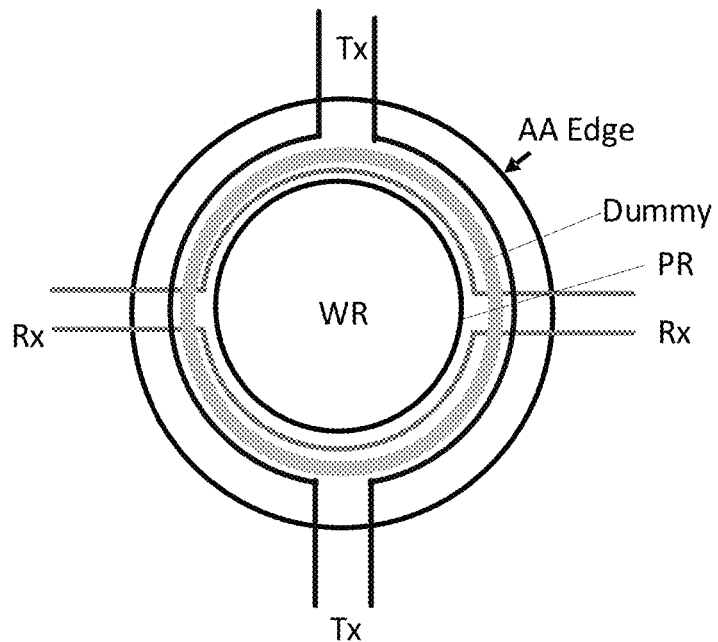
FIG. 4B illustrates a schematic diagram of a connection for a touch structure surrounding a window region in some embodiments according to the present disclosure.

As shown in FIG. 4B, the touch structure of the embodiment of the present disclosure forms dual Tx channels and dual Rx channels in the row direction and the column direction in the window region WR, so that the risk of open circuits may be reduced.

Figure 4C:
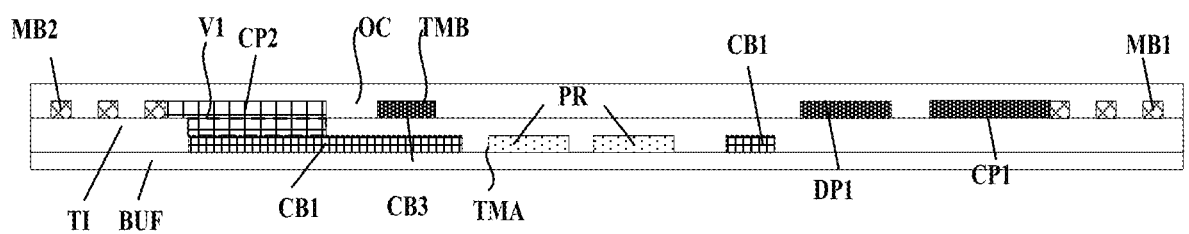
FIG. 4C illustrates a cross-sectional view of a portion of a touch structure along a line LL' in FIG. 3 in some embodiments according to the present disclosure.

As shown in FIGS. 2A and 4A, in this embodiment, since the patterns of the mesh lines with a large area are all missing, relatively large-sized first, second, third, and fourth conductive plates CP1, CP2, CP3 and CP4 are respectively employed for the first, second, third, and fourth window mesh blocks MB1, MB2, MB3, and MB4, wherein each of the first and third conductive plates CP1 and CP3 has a greater width than each of the second and fourth conductive plates CP2 and CP4. In order to prevent the capacitance from being over-compensated, in the embodiment of the present disclosure, the first conductive bridge CB1 and the second conductive bridge CB2 are disposed in a different layer from the first conductive plate CP1 and the second conductive plate CP3 to avoid mutual capacitances between the first conductive bridge CB1 and the first conductive plate CP1 and between the second conductive bridge CB2 and the third conductive plate CP3. For example, as shown in FIG. 4A, a first via V1, a second via V2, a third via V3 and a fourth via V4 are respectively formed at positions where the second conductive plate CP2 is connected to the first conductive bridge CB1 and the second conductive bridge CB2, respectively and where the fourth conductive plate CP4 is connected to the first conductive bridge CB1 and the second conductive bridge CB2, respectively, as shown in FIG. 4C, which is particularly a cross-sectional view along a line LL' of the touch structure in FIG. 3. In addition, the metal patterns of the first conductive plate CP1 and the first conductive bridge CB1 are disposed in different layers. In this way, short circuits caused by metal particles remaining in the processes of exposure, development, and etching in the process of forming the metal patterns may also be avoided.

In order to reduce process complexity, other layers may be disposed in the same layer. For example, as shown in FIG. 4A, the third conductive bridge CB3 corresponding to the second conductive plate CP2 having a smaller width may be disposed on the same layer as the second conductive plate CP2. At this time, mutual capacitance may be generated between the second conductive plate CP2 and the third conductive bridge CB3. In order to prevent the capacitance from being over-compensated, a second dummy plate DP2 (labeled as "Dummy" in FIG. 4B) is further disposed between the second conductive plate CP2 and the third conductive bridge CB3. Similarly, a fourth dummy plate DP4 is disposed between the fourth conductive plate CP4 and the third auxiliary conductive bridge CB32. In one embodiment, the second dummy plate DP2 may be disposed to fill a space between the third conductive bridge CB3 and the second conductive plate CP2 as much as possible, to prevent interference and to block light while reducing in-plane capacitance on the same layer.

As shown in FIG. 4A, the touch structure of the embodiment of the present disclosure further includes a first dummy plate DP1 and a third dummy plate DP3. In an orthographic projection of the touch structure, the first dummy plate DP1 is located between the first conductive plate CP1 and the first conductive bridge CB1, and the third dummy plate DP3 is located between the third conductive plate CP2 and the second conductive bridge CB2. The provision of the first dummy plate DP1 and the third dummy plate DP3 may prevent signal interference between the respective metal patterns and block the light.

In addition, as shown in FIG. 4A, the touch structure of the present disclosure further includes a protection ring PR surrounding the periphery of the window region, and configured to prevent the light from entering the display panel from the window region WR. The protection ring PR may be manufactured in various ways. In one example, the protection ring PR has a one-piece structure (e.g., a one-piece ring structure) that substantially surrounds the periphery of the window region WR. In another example, the protection ring PR may also include a plurality of light shield ring blocks spaced apart from each other and surrounding portions of the periphery of the window region WR, i.e., any two adjacent ones of the plurality of light shield ring blocks have a small port therebetween, whereby static electricity may be discharged. The first, second, third, and fourth conductive plates CP1, CP2, CP3, and CP4 are, for example, arc-shaped respectively, and extend substantially around the first, second, third, and fourth portions P1, P2, P3, and P4 of the window region, respectively, in terms of orthographic projections; the first conductive bridge CB1, the second conductive bridge CB2, the third conductive bridge CB3 and the third auxiliary conductive bridge CB32 are, for example, respectively arc-shaped, and further, are, for example, respectively fan-shaped rings, and also extend substantially around the first portion P1, the second portion P2, the third portion P3 and the fourth portion P4 of the window region, respectively; the first, second, third and fourth dummy plates DP1, DP2, DP3, DP4, are, for example, respectively arc-shaped, and also extend substantially around the first, second, third and fourth portions P1, P2, P3, P4 of the window region, respectively. The arc-shaped metal patterns may be concentric or non-concentric, which is not limited by the present disclosure.

As shown in FIG. 4A, the touch structure in the window region WR includes, in order from inside to outside, the protection ring PR, the first conductive bridge CB1/the second conductive bridge CB2/the third conductive bridge CB3/the third auxiliary conductive bridge CB32, the first dummy plate DP1/the second dummy plate DP2/the third dummy plate DP3/the fourth dummy plate DP4, and the first conductive plate CP1/the second conductive plate CP2/the third conductive plate CP3/the fourth conductive plate CP4 and other metal patterns. In this embodiment, the metal patterns may be all disposed as fan-shaped rings, and further, the fan-shaped rings may even be all disposed concentrically (for example, the circle center is a circle center when the orthographic projection of the window region WR is the circle), so that the metal patterns may be closely arranged, the capacitance compensation may be easily achieved, and the over-compensation may be prevented.

Specifically, as shown in FIG. 4C, the touch structure of the embodiment of the present disclosure includes a buffer layer BUF; a touch insulating layer TI on the buffer layer BUF; the second window mesh blocks MB2 and the first window mesh blocks MB1 on a side of the touch insulating layer TI away from the buffer layer BUF; and an overcoat layer OC on a side of the touch insulating layer TI away from the buffer layer BUF and covering the first window mesh blocks MB1, the second window mesh blocks MB2, the first conductive plate CP1, the second conductive plate CP2, and the third conductive plate CB3. As shown in FIG. 4C, the touch structure of the embodiment of the present disclosure includes two metal layers, that is, a first metal layer TMA including the protection ring PR, the first conductive bridge CB1; a second metal layer TMB including the second conductive plate CP2, the first conductive plate CP1; the first conductive bridge CB1 and the second conductive plate CP2 are directly connected together through the first via V1.

As described above, in the embodiment shown in FIGS. 1 to 4C, other metal patterns are on the touch insulating layer TI, that is, on the second metal layer TMB, except for the first conductive bridge CB1, the second conductive bridge CB2, and the protection ring PR. To reduce the impedance and improve the touch detection reliability, a resistance of the second metal layer TMB may be selected to be less than that of the first metal layer TMA.

The above embodiment gives a relatively simple construction in that the window region WR is formed in the middle of four window mesh blocks, so that there is only one cross-window row Rwc and one cross-column row Cwc across the touch structure, which is not limited by the present disclosure.

Figure 5:
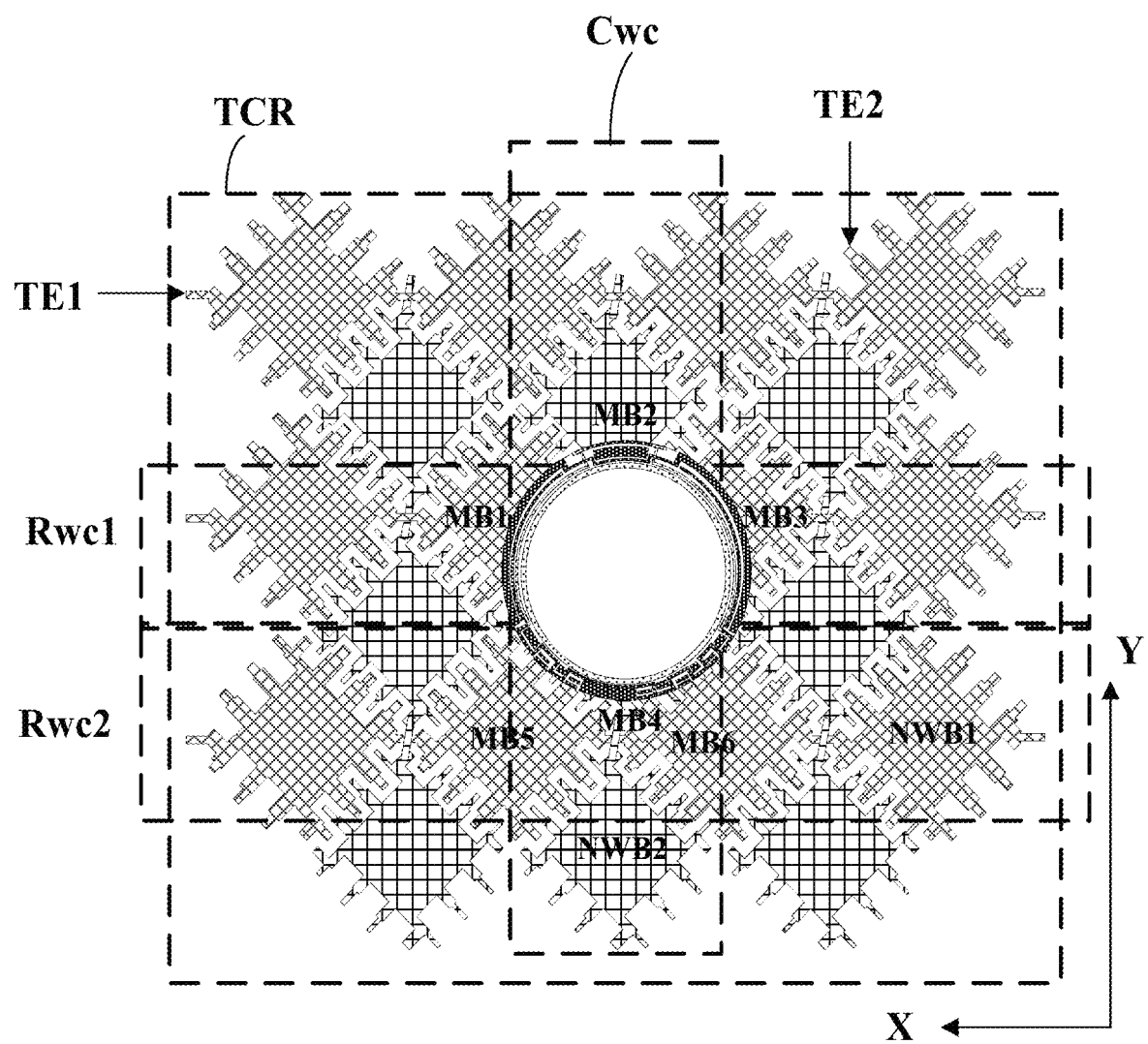
FIG. 5 is a schematic diagram illustrating a touch structure in some embodiments according to the present disclosure.
Figure 6A:
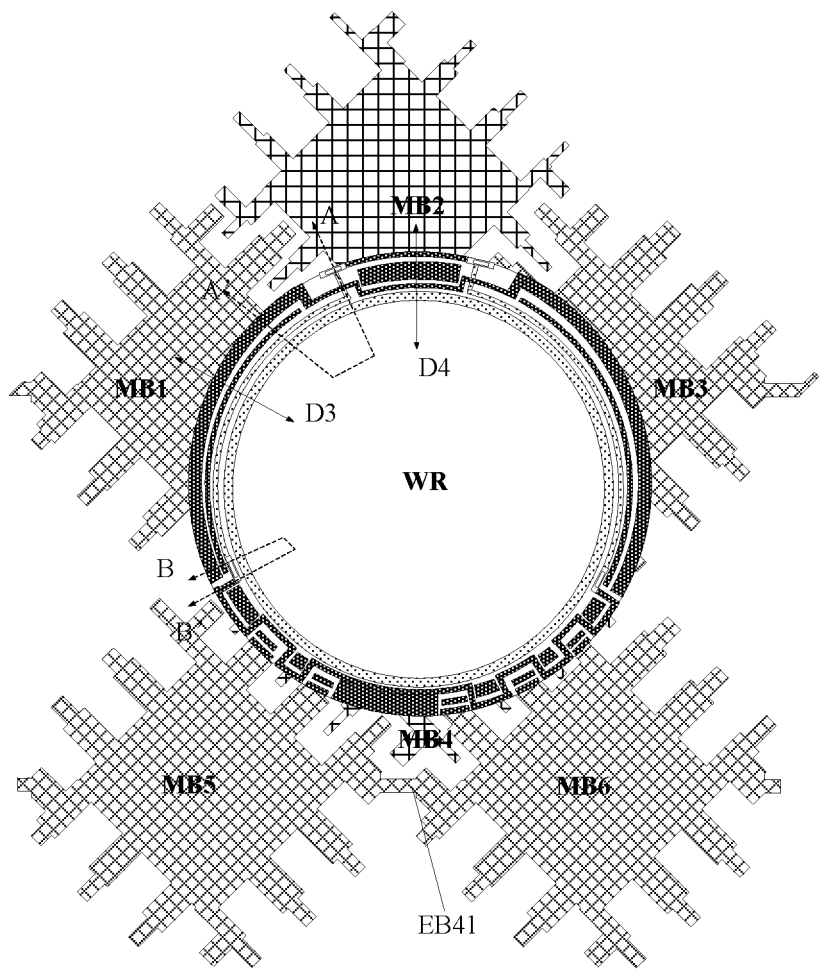
FIGS. 6A and 6B respectively illustrate enlarged views of a touch structure surrounding a window region in some embodiments according to the present disclosure.
Figure 6B:
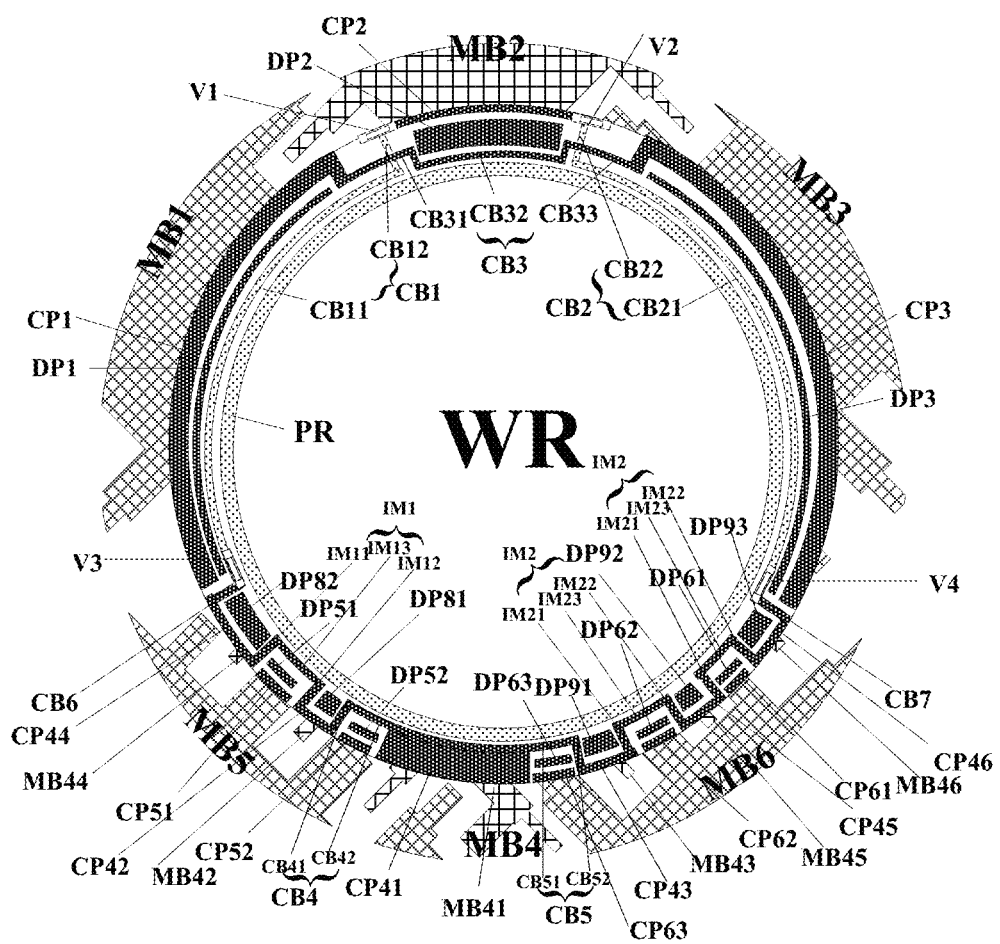

FIGS. 5, 6A, and 6B illustrate a touch structure of an embodiment of the present disclosure. As shown in FIG. 5, the window region WR of the touch structure crosses over the first mesh electrodes TE1 of two adjacent rows and crosses over one column of the second mesh electrode TE2. That is, the touch structure of this embodiment includes a first cross-window row Rwc1, a second cross-window row Rwc2, and a cross-window column Cwc.

As shown in FIG. 5, a majority of the window region WR is in the first cross-window row Rwc1 and the cross-window column Cwc, while a small portion of the window region WR is in the second cross-window row Rwc2.

Similar to the embodiment shown in FIGS. 2A to 4C, in the embodiment shown in FIG. 6B, the touch structure includes the first window mesh block MB1, the first conductive plate CP1 directly connected to the first window mesh block MB1, the third window mesh block MB3, the third conductive plate CP3 directly connected to the third window mesh block MB3, the second window mesh block MB2, and the second conductive plate CP2 directly connected to the second window mesh block MB2. Due to the existence of the window region WR, the patterns of the first window mesh block MB1, the second window mesh block MB2 and the third window mesh block MB3 will be greatly missing. Thus, relatively large-sized first, second and third conductive plates CP1, CP2 and CP3 are respectively employed for the first, second and third window mesh blocks MB1, MB2 and MB3, to compensate for the missing of the patterns. Further, the first and third window mesh blocks MB1 and MB3 have greater pattern missing than the second window mesh block MB2, and thus the width of each of the first and third conductive plates CP1 and CP3 for compensating for the missing of the patterns are greater than the width of the second conductive plate CP2. Similar to the embodiment shown in FIG. 4A, the first conductive plate CP1, the second conductive plate CP2, and the third conductive plate CP3 may be provided in an arc shape, further may be provided as fan-shaped rings, and further may be provided as concentric fan-shaped rings.

Similar to the embodiments shown in FIGS. 2 to 4A, the touch structure shown in FIG. 6B further includes the third conductive bridge CB3 connecting the first conductive plate CP1 and the third conductive plate CP3 together; the first and second ends of the second conductive plate CP2 are routed to the first and second conductive bridges CB1 and CB2, respectively, which are in turn electrically connected to the mesh lines on a side of the window region WR opposite to the second conductive plate CP2 in the cross-window column Cwc. The first conductive bridge CB1 and the second conductive bridge CB2 form the dual Tx channels of the second conductive plate CP2, so that the risk of open circuits may be prevented. Similar to the embodiments shown in FIGS. 2 to 4A, in the touch structure in the embodiment shown in FIG. 6B, the first conductive bridge CB1 and the second conductive bridge CB2 are disposed in different layers from the first conductive plate CP1, the second conductive plate CP2 and the third conductive plate CP3, so as to avoid the over-compensation for the capacitance caused by mutual capacitance formed between the first conductive plate CP1 and the second conductive plate CP2.

Figure 8A:
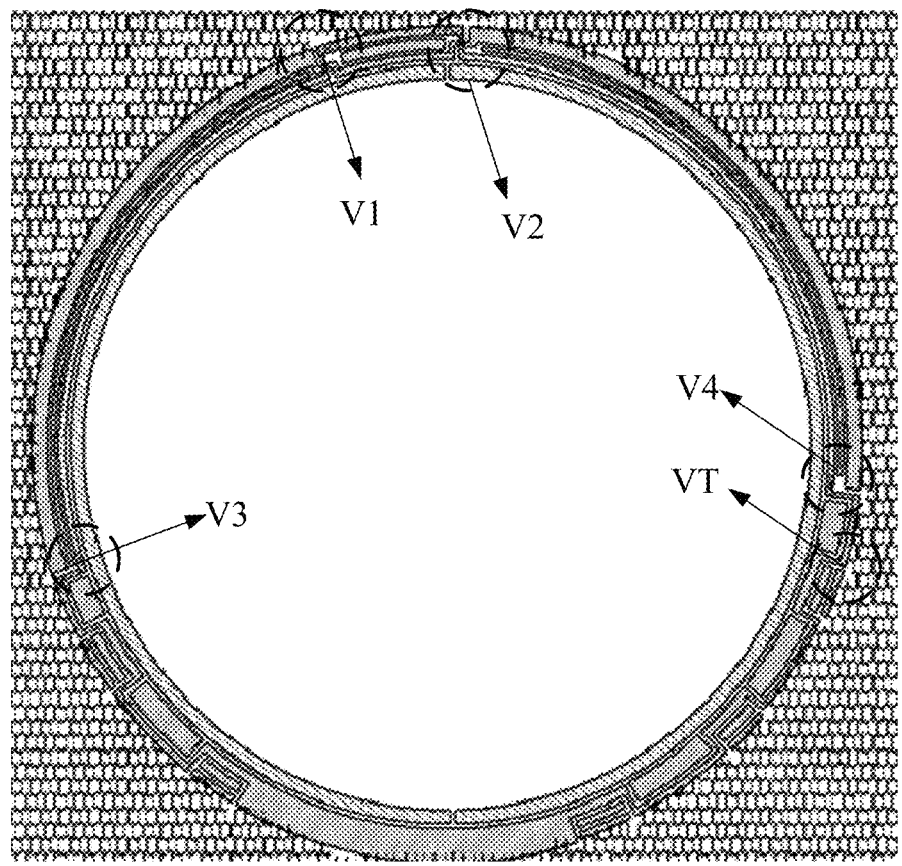
FIGS. 8A to 8C are enlarged views of a layout of a portion of a touch structure surrounding a window region in some embodiments according to the present disclosure.
Figure 8B:
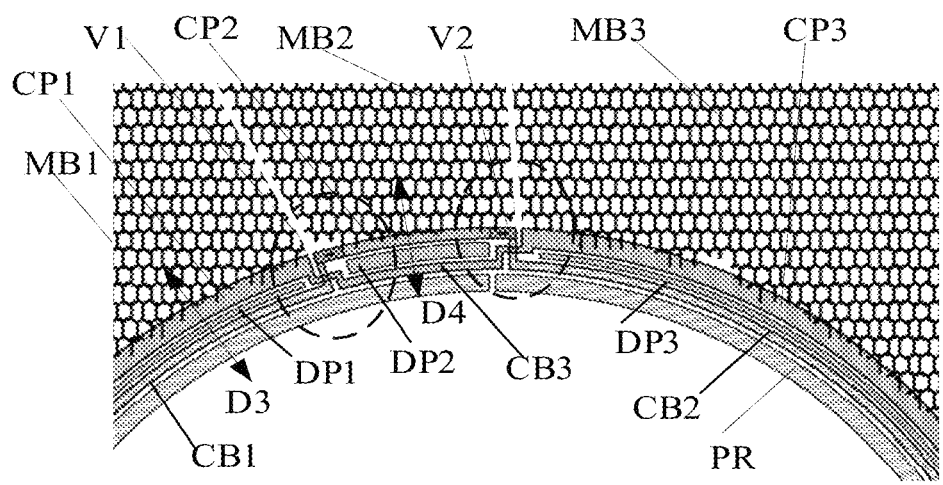
Figure 9A:
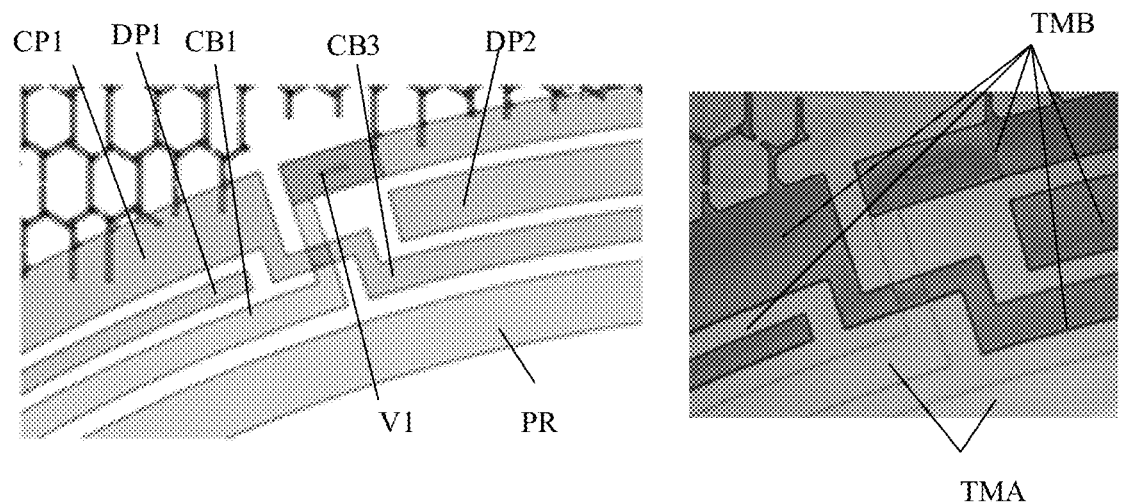
FIGS. 9A to 9E are enlarged views of layouts of portions of a touch structure surrounding a window region in some embodiments according to the present disclosure.
Figure 9B:
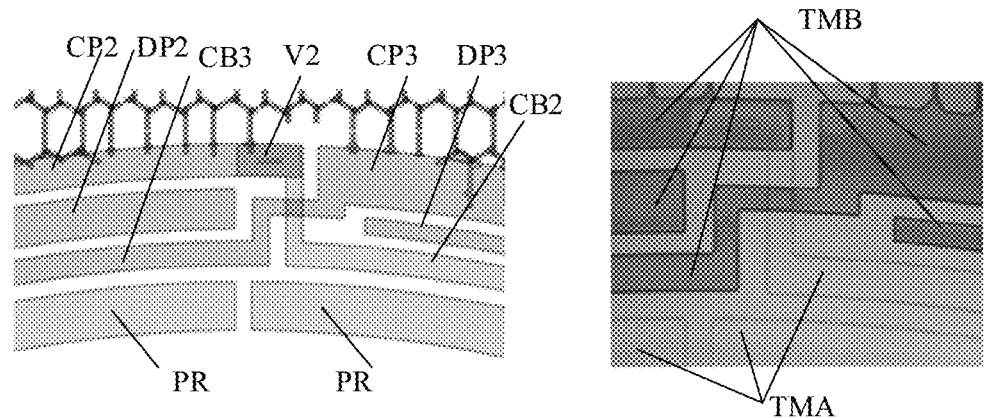
Figure 10:
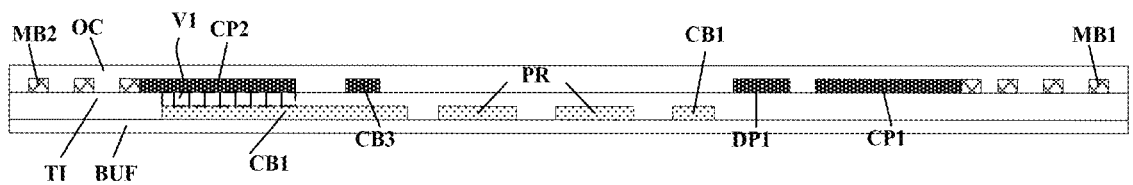
FIG. 10 is a cross-sectional view of a portion of a touch structure along a line AA' in FIG. 6A in some embodiments according to the present disclosure.

FIG. 8B shows an enlarged schematic view of an upper portion of the touch structure shown in FIG. 6B. As shown in FIG. 6B, in the touch structure of the present disclosure, for the first window mesh block MB1, the second window mesh block MB2, and the third window mesh block MB3 different from each other, the relatively large-sized first conductive plate CP1 directly connected to the first window mesh block MB1 is provided, the relatively large-sized second conductive plate CP2 directly connected to the second window mesh block MB2 is provided, and the relatively large-sized third conductive plate CP3 directly connected to the third window mesh block MB3 is provided. A width of the first conductive plate CP1 for compensating for a greater pattern missing in a third direction D3 is greater than that of the second conductive plate CP2 for compensating for a smaller pattern missing in a fourth direction D4. Both ends of the second conductive plate CP2 are connected to the first conductive bridge CB1 and the second conductive bridge CB2, respectively, and the first conductive bridge CB1 and the second conductive bridge CB2 as the dual Tx channels may reduce the risk of open circuits. In addition, as may also be seen in FIGS. 9A and 9B, the first and second conductive bridges CB1 and CB2 are disposed in the first metal layer TMA as TMA dual Tx channels, and the disconnected second window mesh block MB2 in the cross-window column Cwc is connected to the fourth window mesh block MB4 opposite to the second window mesh block MB2 in the second mesh electrode TE2 in the same column as the second window mesh block MB2. Specifically, the dual Tx channels, which is the second metal layer TMA of the first and second conductive bridges CB1 and CB2, connect the second conductive plate CP2 to the second metal layer TMA through the first and second vias V1 and V2 in, for example, the touch insulating layer TI. Specifically, as shown in FIGS. 9A and 9B, FIG. 10, the first conductive bridge CB1, the second conductive bridge CB2, and the protection ring PR are in the first metal layer TMA on a surface of the second metal layer TMB away from the overcoat layer OC, with respect to the first conductive plate CP1, the second conductive plate CP2, the third conductive plate CP3, the first dummy plate DP1, the second dummy plate DP2, the third dummy plate DP3, and the third conductive bridge CB3 disposed in the second metal layer TMB. That is, both ends of the second conductive plate CP2 are respectively connected to the first metal layer TMA through the first via V1 and the second via V2 at both opposite ends of the second conductive plate CP2 so as to avoid the over-compensation for the capacitance caused by mutual capacitance with the first conductive plate CP1 and the third conductive plate CP3, as may be particularly seen in FIG. 10 taken along a line AA' in FIG. 6A. In addition, the risk of open circuits may be reduced by connecting the disconnected second mesh electrodes TE2 in the cross-window column Cwc together through the dual Tx channels.

Further, as shown in FIG. 6B, the first conductive bridge CB1 includes a first connection portion CB12 and a first main portion CB11, the first connection portion CB12 is directly connected to the first end of the second conductive plate CP2, and the first main portion CB11 is directly connected to the first connection portion CB12 and extends along the first portion S1 of the periphery of the window region WR and is closer to the window region WR than the first conductive plate CP1; the second conductive bridge CB2 includes a second connection portion CB22 and a second main portion CB21, the second connection portion CB22 is directly connected to the second end of the second conductive plate CP2, the second main portion CB21 is directly connected to the second connection portion CB22 and extends along the third portion S3 of the periphery of the window region WR and is closer to the window region WR than the third conductive plate CP3; the third conductive bridge CB3 includes a third connection portion CB31, a fourth connection portion CB33 and a third main portion CB32 between the third connection portion CB31 and the fourth connection portion CB33, the third and fourth connection portions CB31 and CB33 are directly connected to the first end of the first conductive plate CP1 and the first end of the third conductive plate CP3, respectively, the third main portion CB32 is directly connected to the third and fourth connection portions CB31 and CB33 and extends along the second portion S2 of the periphery of the window region WR and is closer to the window region WR than the second conductive plate CP2. Further, as shown in FIG. 6B, the first, second and third main portions CB11, CB21 and CB32 are all fan-shaped rings, and orthographic projections of the first, second and third main portions CB11, CB21 and CB32 do not overlap each other.

Further, as shown in FIGS. 6A and 6B, on the fourth side S4, that is, at the lower portion of the window region WR, due to the presence of the window region WR, the fourth window mesh block MB4 lacks most of the mesh lines, a fifth window mesh block MB5 lacks a small fraction of the mesh lines, and a sixth window mesh block MB6 lacks a small fraction of the mesh lines, compared with the window mesh blocks of the first mesh electrode TE1 and the second mesh electrode TE2 which are not covered by the window region WR.

In order to compensate for the missing mesh lines of the fourth window mesh block MB4, the fifth window mesh block MB5, and the sixth window mesh block MB6, in the touch structure of the embodiment of the present disclosure, conductive plates are provided at these missing portions, respectively, and have areas positively correlated to those of the missing mesh lines.

Figure 8C:
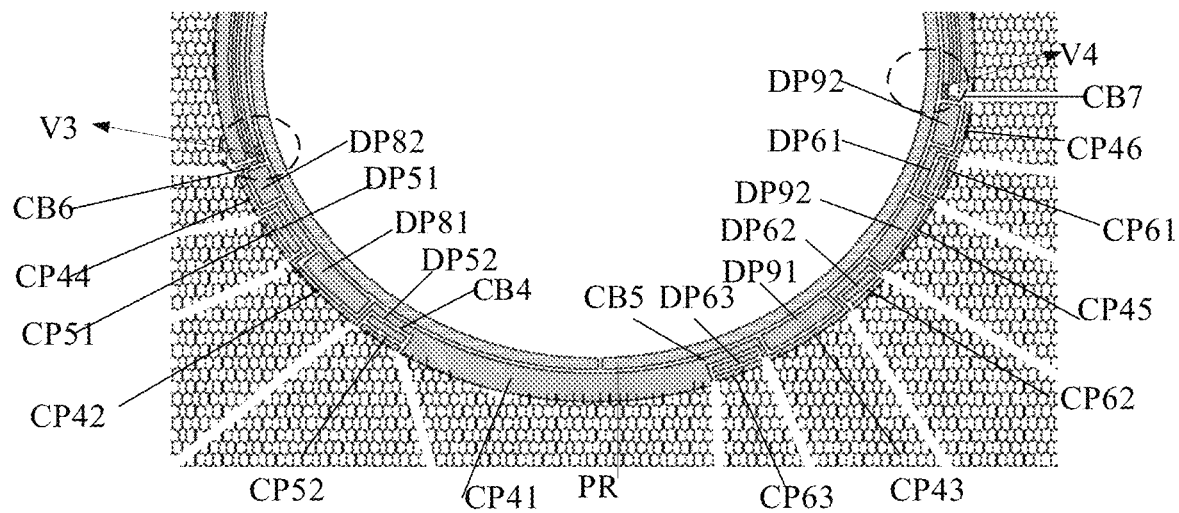

Specifically, as shown in FIGS. 6A, 6B, 8C, the fourth window mesh block MB4 is located substantially at the fourth side S4 of the window region WR opposite to the second side S2, and is divided into a plurality of separate portions by the window region WR. For example, the fourth window mesh block MB4 includes at least one first window mesh sub-block MB41, at least one second window mesh sub-block MB42, MB44 and at least one third window mesh sub-block MB43, MB45, MB46; the first window mesh sub-block MB41 is adjacent to the window region WR and between the at least one second window mesh sub-block MB42, MB44 and the at least one third window mesh sub-block MB43, MB45, MB46; the at least one second window mesh sub-block MB42, MB44 is closer to the first window mesh block MB1 than the first window mesh sub-block MB41; the at least one third window mesh sub-block MB43, MB45, MB46 is closer to the third window mesh block MB3 than to the first window mesh sub-block MB41. For the first window mesh sub-block MB41, a first conductive sub-plate CP41 is provided, and is directly connected to the plurality of mesh lines of the first window mesh sub-block MB41 of the fourth window mesh block MB4 and extends along the fourth portion P4 of the periphery of the window region WR. In order to connect the window mesh blocks at both ends of the cross-window column Cwc together, two touch signal transmission channels are also provided for the fourth window mesh block MB4: the fourth conductive bridge CB4 and a fifth conductive bridge CB5 to establish connections with the first conductive bridge CB1 and the second conductive bridge CB2, respectively. Specifically, the fourth conductive bridge CB4 is directly connected to a first end of the first conductive sub-plate CP41, and the fifth conductive bridge CB5 is directly connected to a second end of the first conductive sub-plate CP 41.

For the at least one second window mesh sub-block MB42, MB44, corresponding second conductive sub-plates CP42, CP44 are provided, respectively, and are directly connected to the plurality of mesh lines of the at least one second window mesh sub-block MB42, MB44 of the fourth window mesh block MB4, respectively, and extend along the fourth portion P4 of the periphery of the window region WR. In order to establish the connection with the first conductive bridge CB1, a sixth conductive bridge CB6 is further provided on a side, close to the first window mesh block MB1, of the farthest second conductive sub-plate CP44 of the at least one second conductive sub-plate CP42, CP44, which is farthest from the first conductive sub-plate CP41, and the sixth conductive bridge CB6 is directly connected to the farthest second conductive sub-plate CP44.

The touch structure of the embodiment as shown in FIG. 6B includes three third window mesh sub-blocks MB43, MB45, MB46, but the present disclosure is not limited thereto, depending on the position where the window region WR is disposed. For example, the touch structure of the embodiment shown in FIG. 7 includes only one window mesh sub-block MB43. For the touch structure shown in FIG. 6B, third conductive sub-plates CP43, CP45, CP46 are provided for the third window mesh sub-blocks MB3, MB45, MB46, and are directly connected to the plurality of mesh lines of the third window mesh sub-blocks MB43, MB45, MB46 of the fourth window mesh block MB4, respectively, and extend along the fourth portion P4 of the periphery of the window region WR. In order to establish a connection with the second conductive bridge CB2, a seventh conductive bridge CB7 is further disposed on a side of the third conductive sub-plate CP3 close to the third window mesh sub-blocks MB43, MB45, MB46, and connected to the third conductive sub-plates CP43, CP45, CP46. For example, in the embodiment shown in FIG. 6B, the seventh conductive bridge CB7 is directly connected to the farthest third conductive sub-plate CP46 of the third conductive sub-plates CP43, CP45, CP46, which is farthest from the first conductive sub-plate CP41.

In this embodiment, a first conductive sub-plate CP41, at least one second conductive sub-plate CP42, CP44, and at least one third conductive sub-plate CP43, CP45, CP46 for compensating for the missing metal mesh patterns are provided for the fourth window mesh block MB4 in which most of the metal mesh patterns are missing in the cross-window column Cwc. In order to construct a touch signal transmission path with the second window mesh block MB2 in the cross-window column Cwc, the first conductive sub-plate CP41, the at least one second conductive sub-plate CP42, CP44, and the at least one third conductive sub-plate CP43, CP45, CP46 are connected together with the second conductive plate CP2 of the second window mesh block MB2 through the fourth conductive bridge CB4, the fifth conductive bridge CB5, the sixth conductive bridge CB6, and the seventh conductive bridge CB7, thereby forming the touch signal transmission path in the cross-window column Cwc.

In this embodiment, at least the first conductive sub-plate CP41 is provided for the fourth window mesh block MB4, and is substantially located on the fourth side S4 of the window region WR opposite to the second side S2, and is directly connected to most of the mesh lines of the fourth window mesh block MB4; the at least one second conductive sub-plate CP42, CP44 is substantially located at a position of the fourth side S4 of the window region WR, close to the first side S1, and is directly connected only to the mesh lines of the finger-shaped mesh sub-blocks of the fourth window mesh block MB4; at least one third conductive sub-plate CP43, CP45, CP46 is substantially located at a position of the fourth side S4 of the window region WR, close to the third side S3, and is directly connected to the mesh lines of the finger-shaped mesh sub-blocks of the fourth window mesh block MB4, respectively, which is similar to the at least one second conductive sub-plate CP2, CP4.

As shown in FIGS. 6A and 6B, due to the presence of the window region WR, the fourth window mesh block MB4 lacks most of the mesh lines, i.e., the area of the fourth window mesh block MB4 is less than ½ of the area of the second non-window mesh block NWB2. Thus, in order to compensate for these missing mesh lines, in the case where the fourth window mesh block MB4 has a limited length extending along the periphery of the window region WR, the first conductive sub-plate CP41 is set as a wider metal pattern, i.e., a large-sized compensation pattern is provided for the fourth window mesh block MB4 for the missing mesh lines, to compensate for the missing mesh lines. For the missing mesh lines of the finger-shaped mesh sub-blocks of the fourth window mesh block MB4, the second conductive sub-plates CP42 and CP4, and the third conductive sub-plates CP43, CP45 and CP46, which are monolithic blocks, are also provided as compensation metal patterns.

As shown in FIGS. 6A and 6B, on the fourth side S4 of the window region WR, the touch structure further includes the fourth conductive bridge CB4 and the fifth conductive bridge CB5 directly connected to both ends of the first conductive sub-plate CP41, and further finally connected to the first conductive bridge CB1 and the second conductive bridge CB2 through other metal patterns, so as to form the dual Tx channels on the cross-window column Cwc to reduce the risk of open circuits.

Specifically, as shown in FIG. 6B, the farthest second conductive sub-plate CP44 is connected to the second end of the first conductive bridge CB1 through the sixth conductive bridge CB6. For example, the sixth conductive bridge CB6 and the first conductive bridge CB1 may be directly connected together through a third via V3 formed in the touch insulating layer TI; the farthest third conductive sub-plate CP46 is connected to the second end of the second conductive bridge CB2 through the seventh conductive bridge CB7. For example, the seventh conductive bridge CB7 and the second conductive bridge CB2 may be directly connected together through a fourth via V4 formed in the touch insulating layer TI.

Figure 9C:
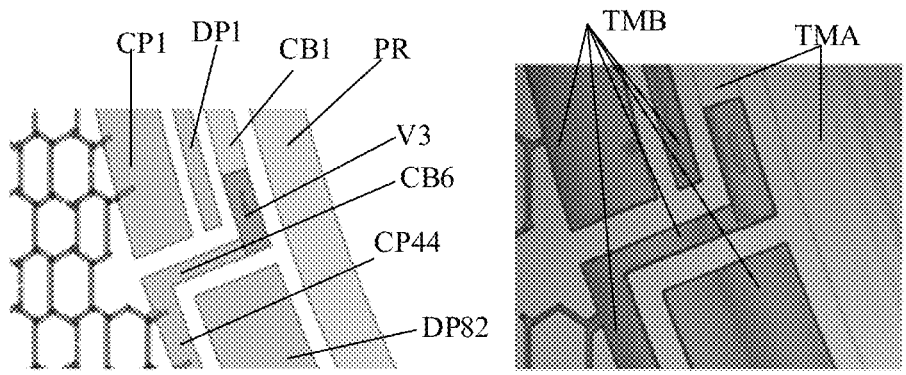
Figure 9D:
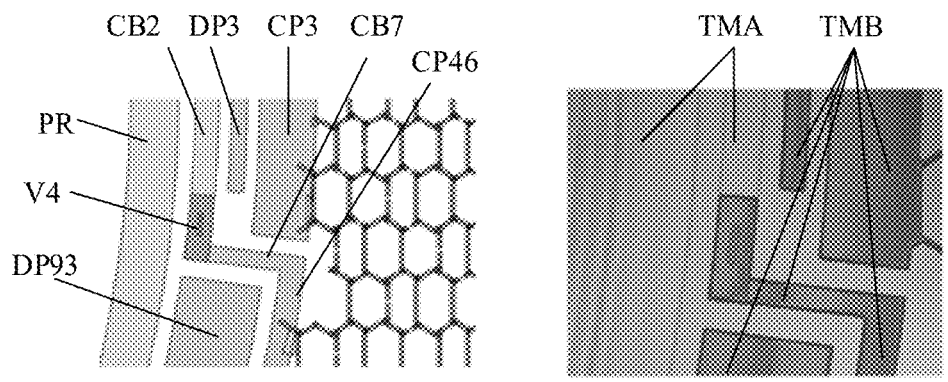
Figure 9E:
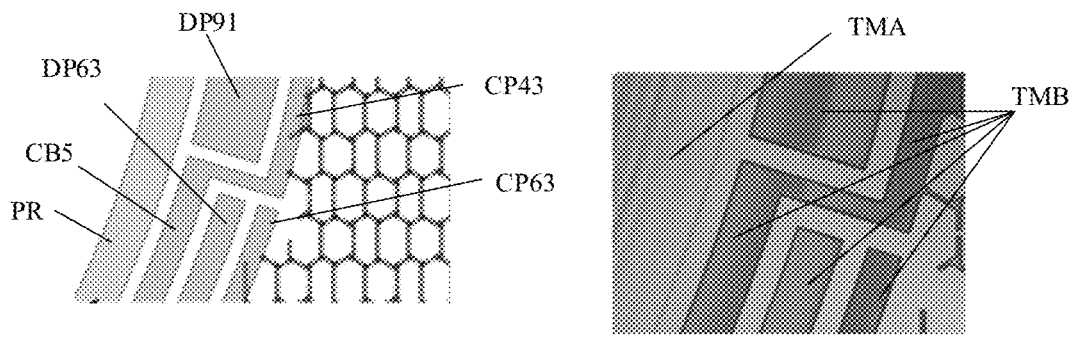
Figure 11:
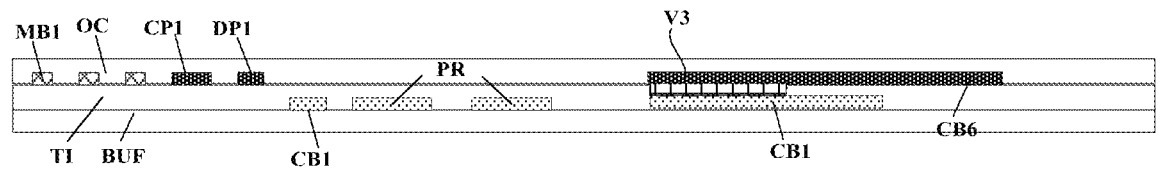
FIG. 11 is a cross-sectional view of a portion of a touch structure along a line BB' in FIG. 6A in some embodiments according to the present disclosure.

For example, as shown in FIG. 6B, a first end of the sixth conductive bridge CB6 is connected to a second end of the farthest second conductive sub-plate CP44; a first end of the seventh conductive bridge CB7 is connected to a second end of the farthest third conductive sub-plate CP46; a second end of the sixth conductive bridge CB6 is connected to a second end of the first conductive bridge CB1 through the third via V3 extending through the touch insulating layer TI; a second end of the seventh conductive bridge CB7 is connected to a second end of the second conductive bridge CB2 through the fourth via V4 extending through the touch insulating layer TI. Further, in this embodiment, an orthographic projection of the third via V3 on the touch insulating layer TI overlaps an orthographic projection of the second end of the first conductive bridge CB1 on the touch insulating layer TI; an orthographic projection of the fourth via V4 on the touch insulating layer TI overlaps an orthographic projection of the second end of the second conductive bridge CB2 on the touch insulating layer TI; the sixth conductive bridge CB6 and the seventh conductive bridge CB7 are in second metal layer TMB. In this embodiment, in constructing the dual Tx channels forming the touch signal path at the periphery of the window region WR, as shown in FIG. 6B, the first main portion CB11 of the first conductive bridge CB1 extends along the first side S1 of the window region WR and is closer to the window region WR than the first conductive plate CP1. On the Tx channels, the first conductive bridge CB1 is in the first metal layer TMA, and a second end of the first main portion CB11 of the first conductive bridge CB1 is connected to the second end of the sixth conductive bridge CB6 through the third via V3 (see FIG. 9C, and FIG. 11 taken along the BB' line of FIG. 6A) in the touch insulating layer TI. In this embodiment, the sixth conductive bridge CB6 is in the second metal layer TMB, and thus, the Tx channels are switched from the first metal layer TMA to the second metal layer TMB at the third via V3, as shown in FIGS. 9C and 11; similarly, as shown in FIG. 6B, the second main portion CB21 of the second conductive bridge CB2 extends along the third side S3 of the window region WR and is closer to the window region WR than the third conductive plate CP3. On the Tx channels, the second conductive bridge CB2 is located in the first metal layer TMA, and a second end of the second main portion CB21 of the second conductive bridge CB2 is connected to the second end of the seventh conductive bridge CB7 through the fourth via V4 (see FIG. 9D) in the touch insulating layer TI. In this embodiment, the seventh conductive bridge CB7 is in the second metal layer TMB, and thus, the Tx channels are switched from the first metal layer TMA to the second metal layer TMB at the fourth via V4, as shown in FIG. 9D.

Figure 12:
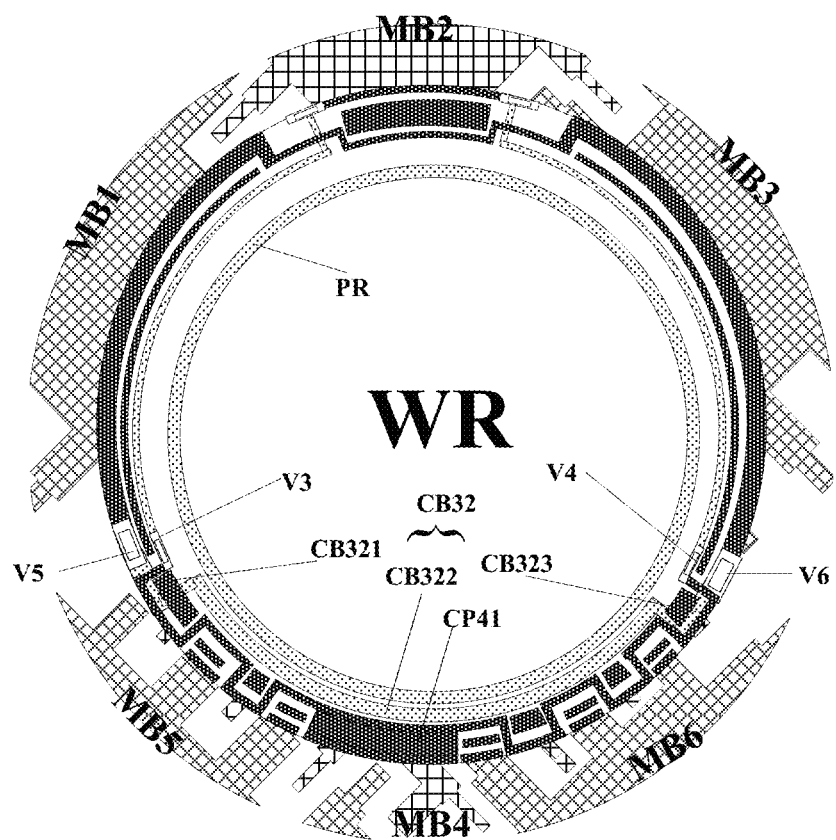
FIG. 12 is an enlarged view of a portion of a touch structure surrounding a window region in some embodiments according to the present disclosure.

Further, as shown in FIG. 12, in this embodiment, the touch structure may further include a third auxiliary conductive bridge CB32 including a first auxiliary connection portion CB321, a second auxiliary connection portion CB323, and a first auxiliary main portion CB322 connected between the first auxiliary connection portion CB321 and the second auxiliary connection portion CB323; the first auxiliary main portion CB322 extends along the fourth portion P4 of the periphery of the window region WR and is closer to the window region WR than the first conductive sub-plate CP41; a first end of the first auxiliary connection portion CB321 is directly connected to the second end of the first conductive plate CP1 through a fifth via V5 extending through the touch insulating layer TI; and a second end of the first auxiliary connection portion CB321 is directly connected to a first end of the first auxiliary main portion CB322; and a first end of the second auxiliary connection portion CB323 is directly connected to a second end of the third conductive plate CP3 through a sixth via V6 extending through the touch insulating layer TI, and a second end of the second auxiliary connection portion CB323 is directly connected to a second end of the first auxiliary main portion CB322; and the third auxiliary conductive bridge CB32 is in the first metal layer TMA. As shown in FIG. 12, the third auxiliary conductive bridge CB32 directly connects the second end of the first conductive plate CP1 and the second end of the third conductive plate CP3 together, thereby forming the dual Rx channels in the row direction together with the third conductive bridge CB3, thereby constructing a touch signal transmission path for the dual Rx channels, thereby reducing the risk of open circuits.

Figure 13:
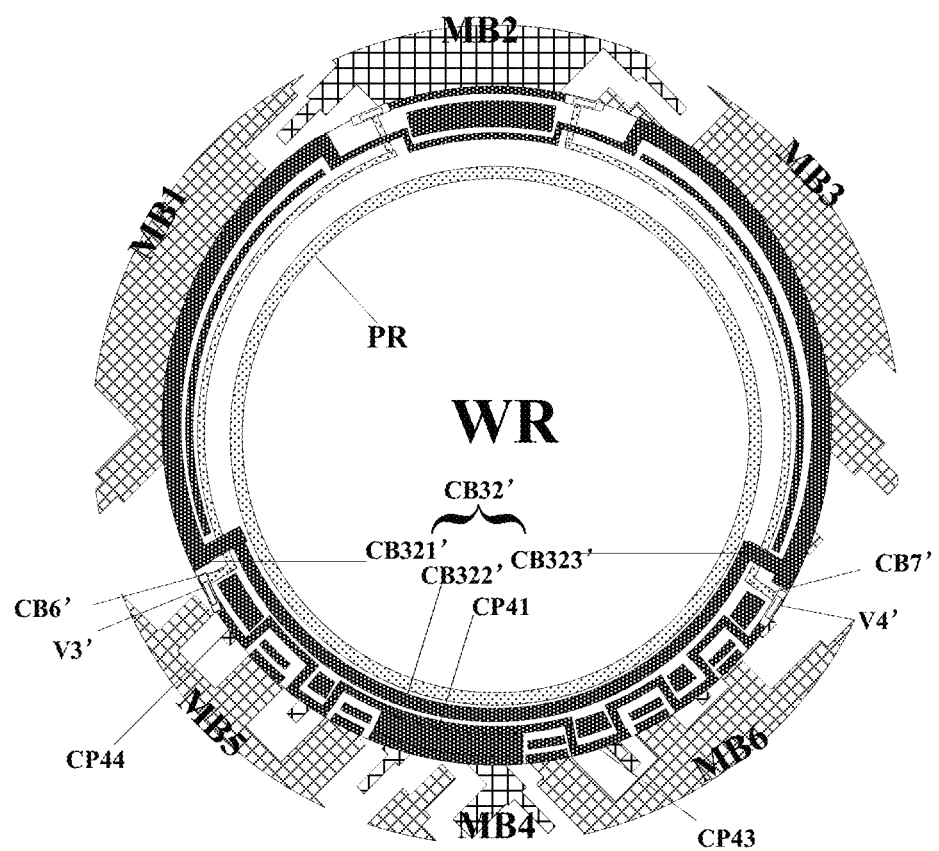
FIG. 13 is an enlarged view of a portion of a touch structure surrounding a window region in some embodiments according to the present disclosure.

Unlike the embodiment shown in FIG. 12, in the embodiment shown in FIG. 13, in the cross-window column Cwc, a third via V3' for switching the Tx channels from the first metal layer TMA to the second metal layer TMB is disposed at a first end of a sixth conductive bridge CB6', i.e., an end connected to the farthest second conductive sub-plate CP44. An orthographic projection of the third via V3' on the touch insulating layer is distant from the window region WR with respect to the first main portion CB11 of the first conductive bridge CB1, and the sixth conductive bridge CB6' is disposed in the first metal layer TMA.

Specifically, as shown in FIG. 13, the first end of the sixth conductive bridge CB6' is connected to the second end of the farthest second conductive sub-plate CP44 through the third via V3' extending through the touch insulating layer TI; a first end of a seventh conductive bridge CP7' is connected to the second end of the farthest third conductive sub-plate CP46 through a fourth via V4' extending through the touch insulating layer TI; a second end of the sixth conductive bridge CB6' is connected to the second end of the first conductive bridge CB1; a second end of the seventh conductive bridge CB7' is connected to the second end of the second conductive bridge CB2. In this embodiment, the orthographic projection of the third via V3' on the touch insulating layer TI overlaps an orthographic projection of the second end of the farthest second conductive sub-plate CP44 on the touch insulating layer TI; an orthographic projection of the fourth via V4' on the touch insulating layer TI overlaps an orthographic projection of the second end of the farthest third conductive sub-plate CP46 on the touch insulating layer TI; at this time, the sixth conductive bridge CB6' and the seventh conductive bridge CB7' are in the first metal layer TMA.

Further, as shown in FIG. 13, the touch structure further includes a third auxiliary conductive bridge CB32' including a first auxiliary connection portion CB321', a second auxiliary connection portion CB323', and a first auxiliary main portion CB322' connected between the first auxiliary connection portion CB321' and the second auxiliary connection portion CB323'; the first auxiliary main portion CB322' extends along the fourth portion P4 of the periphery of the window region WR and is closer to the window region WR than the first conductive sub-plate CP41; a first end of the first auxiliary connection portion CB321' is directly connected to the second end of the first conductive plate CP1, a second end of the first auxiliary connection portion CB 321' is directly connected to a first end of the first auxiliary main portion CB322', a first end of the second auxiliary connection portion CB323' is directly connected to the second end of the third conductive plate CP3, and a second end of the second auxiliary connection portion CB323' is directly connected to a second end of the first auxiliary main portion CB322'; and the third auxiliary conductive bridge CB32' is in second metal layer TMB. As shown in FIG. 13, the third auxiliary conductive bridge CB32' directly connects the second end of the first conductive plate CP1 and the second end of the third conductive plate CP3 together, thereby forming the dual Rx channels in the row direction together with the third conductive bridge CB3, thereby constructing the touch signal transmission path for the dual Rx channels, thereby reducing the risk of open circuits.

As described above, the first and second conductive bridges CB1 and CB2 are disposed in the first metal layer TMA under the touch insulating layer TI to avoid the over-compensation for the capacitance, wherein a signal path is formed for the second conductive plate CP2 on the cross-window column Cwc by using the first and second vias V1 and V2 formed in the touch insulating layer TI. As shown in FIGS. 6B and 8C, due to the presence of the window region WR, the capacitance compensation for the fourth side S4 of the window region WR is more complicated, because, in the embodiment shown in FIGS. 6B and 8C, the fourth side S4 of the window region WR is located at a position where one row of the first mesh electrode TE1 and one column of the second mesh electrode TE2 intersect with each other, so that as shown in FIG. 6B, the fourth side S4 of the periphery of the window region WR alternately contacts the mesh lines of the first mesh electrode TE1 and the second mesh electrode TE2, and it is accordingly necessary to provide alternate compensating conductive plates for the missing mesh lines of the first mesh electrode TE1 and for the missing mesh lines of the second mesh electrode TE2. In this case, it is difficult to repeatedly form the first, second, third, and fourth vias V1, V2, V3, and V4 similar to those of the first and second conductive bridges CB1 and CB 2. Therefore, on the fourth side S4 of the window region WR, the compensation metal patterns included in the touch structure for compensating for the missing mesh lines of the first mesh electrode TE1 and the second mesh electrode TE2 may be disposed in the second metal layer TMB.

Specifically, as shown in FIGS. 9A to 9E, the metal patterns provided for the missing mesh lines of the first mesh electrode TE1 and the second mesh electrode TE2 are provided in the first metal layer TMB.

Referring to FIGS. 6A, 6B, 8C, and 9A to 9E, at least one cross-window row of the touch structure of the present disclosure further includes a second cross-window row Rwc2 adjacent to the first cross-window row Rwc1, and the second cross-window row Rwc2 includes: a fifth window mesh block MB5, which is adjacent to the window region WR and located on the same side as the second window mesh sub-blocks MB42, MB44, and includes at least one fifth window mesh sub-block. In this embodiment, the at least one fifth window mesh sub-block is finger-shaped mesh sub-blocks and intersects the second window sub-blocks MB42, MB44 and is alternately located on the fourth side S4 of the window region. The fifth window mesh block MB5 includes: at least one fifth conductive sub-plate CP51, CP52 provided in one-to-one correspondence with the at least one fifth window mesh sub-block, and directly connected to the plurality of mesh lines of the plurality of finger-shaped mesh sub-blocks of the fifth window mesh block MB5 and extending along the fourth portion P4 of the periphery of the window region WR. Accordingly, the at least one fifth conductive sub-plate CP51, CP52 and the at least one second conductive sub-plate CP42, CP44 are arranged to alternately extend along the fourth portion P4 of the periphery of the window region WR. The second cross-window row Rwc2 includes: a sixth window mesh block MB6, which is adjacent to the window region WR and located on the same side as the third window mesh sub-blocks MB43, MB45, MB46. When the touch structure includes a plurality of third window mesh sub-blocks (as shown in FIG. 6B, the touch structure includes three third window mesh sub-blocks MB43, MB45, MB46), the sixth window mesh block MB6 includes a plurality of finger-shaped mesh sub-blocks alternately located on the fourth side S4 of the window region WR as the plurality of third window mesh sub-blocks. The sixth window mesh block MB6 includes at least one sixth conductive sub-block CP61, CP62, CP63 directly connected to the plurality of mesh lines of the plurality of finger-shaped mesh sub-blocks of the sixth window mesh block MB6 and extending along the fourth portion P4 of the periphery of the window region WR. The fifth window mesh block MB5 and the sixth window mesh block MB6 are directly connected to each other through an electrode bridge EB41 on a side of the window region WR away from the first cross-window row Rwc1.

Specifically, as shown in FIGS. 6B and 8C, in the extending direction of the fourth portion P4 along the periphery of the window region WR, the fifth conductive sub-plate CP52 is located between the second conductive sub-plate CP42 and the first conductive sub-plate CP41, and the fifth conductive sub-plate CP51 is located between the second conductive sub-plate CP42 and the second conductive sub-plate CP44; and the sixth conductive sub-plate CP63 is located between the first conductive sub-plate CP41 and the third conductive sub-plate CP43, the sixth conductive sub-plate CP62 is located between the third conductive sub-plate CP43 and the third conductive sub-plate CP45, and the sixth conductive sub-plate CP61 is located between the third conductive sub-plate CP45 and the third conductive sub-plate CP46. In the embodiment shown in FIG. 6B, the touch structure only includes two second conductive sub-plates CP42 and CP44 on a side of the first conductive sub-plate CP41 close to the first conductive plate CP1. For convenience of description, the second conductive sub-plate CP42 close to the first conductive sub-plate CP41 may be referred to as a nearest second conductive sub-plate CP42, and the second conductive sub-plate CP44, farther from the first conductive sub-plate CP41 and closer to the first conductive sub-plate CP1 than the nearest second conductive sub-plate CP42, may be referred to as a farthest second conductive sub-plate CP44; similarly, for the third conductive sub-plates CP43, CP45, CP46, the third conductive sub-plate CP43 close to the first conductive sub-plate CP41 may be referred to as a nearest third conductive sub-plate CP43, and the third conductive sub-plate CP46 farthest from the first conductive sub-plate CP41 and closest to the third conductive sub-plate CP3 with respect to the nearest third conductive sub-plate CP43 may be referred to as a farthest third conductive sub-plate CP46.

As shown, the metal mesh patterns, to which the fifth and sixth conductive sub-plates CP52, CP51, CP63, CP62, and CP61 are connected, are finger-shaped mesh sub-blocks, respectively. That is, only a small portion of the mesh patterns is missing from the finger-shaped mesh sub-blocks on the fifth window mesh block MB5 and the sixth mesh block MB6. Therefore, as may be seen from FIG. 6B, each of the fifth conductive sub-plates CP52 and CP51 that compensate for the missing patterns of the fifth window mesh block MB5 is small, and each of the sixth conductive sub-plates CP61, CP62 and CP63 that compensate for the missing patterns of the sixth window mesh block MB6 is also small. In one embodiment, as shown in FIG. 6B, a width of each of the at least one fifth conductive sub-plate CP51, CP52 along a direction perpendicular to an interface between the fifth conductive sub-plate and a corresponding finger-shaped mesh sub-block is substantially equal to a width of each of the at least one sixth conductive sub-plate CP61, CP62, CP63 along a direction perpendicular to an interface between the sixth conductive sub-plate and a corresponding finger-shaped mesh sub-block. Thus, the manufacturing process may be simplified, and whether the compensation is appropriate or not may be easily derived.

As shown in FIGS. 6A and 6B, due to the presence of the window region WR, the fourth window mesh block MB4 lacks most of the mesh lines, i.e., only the first window mesh sub-block MB41, the second window mesh sub-blocks MB42, MB44, the third window mesh sub-blocks MB43, MB45, MB46, which are finger-shaped mesh sub-blocks, of the fourth window mesh block are left. Therefore, in order to compensate for the greater missing of patterns, a wider first conductive sub-plate CP41 is provided for the first window mesh sub-block MB41. For example, in the case that the first conductive sub-plate CP41 is a fan-shaped ring, a width of the first conductive sub-plate CP41 in a direction perpendicular to an interface between the first conductive sub-plate CP41 and the first window mesh sub-block MB41 may be set to be between 140 μm and 160 μm, for example, 150 μm.

As shown in FIG. 6B, the first end of the first conductive sub-plate CP41 is connected to the second end of the first conductive bridge CB1 opposite to the first end through the fourth conductive bridge CB4, the second conductive sub-plates CP42, CP44, and the sixth conductive bridge CB6; the second end of the first conductive sub-plate CP41 is connected to the second end of the second conductive bridge CB2 opposite to the first end through the fifth conductive bridge CB5, the third conductive sub-plates CP43, CP45, CP46, and the seventh conductive bridge CB7. Based on this, in the cross-window column Cwc, the first conductive bridge CB1 having dual channels and the second conductive bridge CB2 having dual channels, the fourth conductive bridge CB4 having dual channels and the fifth conductive bridge CB5 having dual channels, and the sixth conductive bridge CB6 having dual channels and the seventh conductive bridge CB7 having dual channels form the dual Tx channels in the cross-window column Cwc, thereby greatly avoiding the risk of open circuits. The above structure forms the fourth conductive structure for the fourth window mesh block MB4, which forms a touch signal transmission path between the second window mesh block MB2 and the fourth conductive mesh block MB4 in a direction of the cross-window column Cwc.

As shown in FIG. 6B, in addition to forming the protection ring PR close to a side of the window region WR, each metal pattern of the touch structure below the window region WR (i.e., in the second cross-window row Rwc2) is in the second metal layer TMB. For example, the Rx channel of the first mesh electrode TE1 and the Tx channel of the second mesh electrode TE2 are disposed in the second metal layer TMB, and other dummy plates (identified as Dummy in FIG. 4B) are also disposed in the second metal layer TMB. In this region, the window mesh block structure to which the respective conductive plates for compensating for the missing mesh lines are connected is relatively complicated, so that it is difficult to provide the vias as relatively simple as in the structure of the conductive plates in the first cross-window row Rwc1. Accordingly, as shown in FIG. 6B, when the respective conductive plates are disposed for the second cross-window row Rwc2 to compensate for the missing mesh lines, the first and second conductive bridges CB1 and CB2 are connected to the sixth and seventh conductive bridges CB6 and CB7 through the third and fourth vias V3 and V4, respectively.

Specifically, the fifth conductive sub-plates CP52, CP51, the sixth conductive sub-plates CP61, CP62, CP63, the first conductive sub-plate CP41, the second conductive sub-plates CP42, CP44, the third conductive sub-plates CP43, CP45, CP46, the fourth conductive bridge CB4, the fifth conductive bridge CB5, the sixth conductive bridge CB6, and the seventh conductive bridge CB7 are in the same layer (e.g., the second metal layer TMB) as the first conductive plate CP1, the second conductive plate CP2, and the third conductive plate CP3; the sixth conductive bridge CB6 is connected to the second end of the first conductive bridge CB1 through the third via V3 extending through the touch insulating layer TI; the seventh conductive bridge CB7 is connected to the second end of the second conductive bridge CB2 through the fourth via V4 extending through the touch insulating layer TI.

As shown in FIG. 6B, since the fourth window mesh block MB4 lacks most of the mesh patterns, in order to compensate for the lack of the mesh patterns, the fourth conductive structure provided for the fourth window mesh block MB4 includes the first conductive sub-plate CP41, the second conductive sub-plates CP42, CP44, the third conductive sub-plates CP43, CP45, and CP46, which are all directly connected to the plurality of mesh lines of the fourth window mesh block MB4.

However, the present disclosure is not limited thereto. It is may not be sufficient to compensate for the missing mesh patterns by merely providing the conductive plates directly connected to the plurality of mesh lines of the window mesh block according to a position where the window region WR is disposed. For example, due to the arrangement of the window region WR shown in FIG. 7, the touch structure includes only one third window mesh sub-block MB43 on the fourth side S4 of the window region. In this case, the fourth conductive structure may further include at least one auxiliary conductive sub-plate CP45', CP46', which is not connected to the metal patterns of the fourth window mesh block MB4, but is connected to the first, second and third conductive sub-plates CP41, CP42, CP44, and CP43, and extends along the fourth portion P4 of the periphery of the window region WR, for assisting the first, second, and third conductive sub-plates CP41, CP42, CP44, and CP43 to compensate for the missing mesh patterns and form a touch signal transmission path in the column direction.

Figure 7:
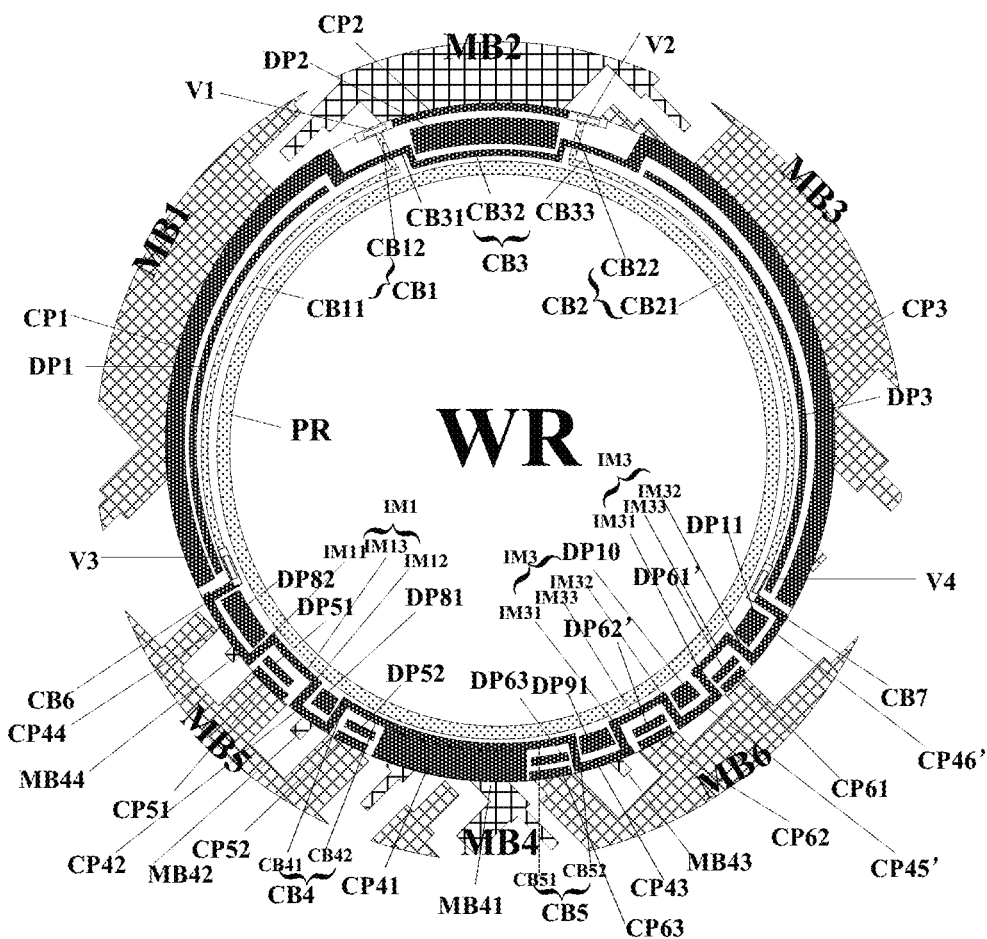
FIG. 7 is an enlarged view of a touch structure surrounding a window region in some embodiments according to the present disclosure.

Specifically, as shown in FIG. 7, the auxiliary conductive sub-plates CP45', CP46' may be fan-shaped arc, like the first conductive sub-plate CP41, the second conductive sub-plates CP42, CP44, and the third conductive sub-plate CP43. Meanwhile, in order to further simplify the manufacturing process and effectively calculate the compensation capacitance, the auxiliary conductive sub-plates CP45', CP46', the first conductive sub-plate CP41, the second conductive sub-plates CP42, CP44 and the third conductive sub-plate CP43 may be arranged as concentric arcs, that is, the circle center of the window region WR may be used as the circle center of each arc. Further, the widths of the fan-shaped arcs may be set to be the same. As shown in FIG. 7, in this embodiment, the auxiliary conductive sub-plates CP45', CP46' are disposed on the same side as the third conductive sub-plate CP43, which mainly depends on the position where the window region WR is disposed. In this case, at the position where the auxiliary conductive sub-plates CP45', CP46' are disposed, the mesh lines of the fourth window mesh block MB4 are not present, that is, the fourth window mesh block MB4 is completely occupied by the window region WR at this position. However, as will be understood by one of ordinary skill in the art, the present disclosure is not limited thereto. For example, when the window region WR is moved toward the first window mesh block MB1, the fourth window mesh sub-block MB44 may be completely occupied by the window region WR, and at this time, an auxiliary conductive sub-plate may be disposed without the metal mesh lines therein to assist other conductive plates to achieve the capacitance compensation.

As shown in FIG. 6B, the fourth conductive structure for forming the touch signal transmission path in the cross-window column Cwc further includes at least one first intermediate connection structure IM1, both ends of which are connected between two adjacent second conductive sub-plates. In the embodiment as shown in FIG. 6B, when the touch structure includes only two second conductive sub-plates CP42, CP44 below the window region WR, the fourth conductive structure includes one first intermediate connection structure IM1 having a first end connected to the second conductive sub-plate CP42 close to the first conductive sub-plate CP41 and a second end connected to the second conductive sub-plate CP44 adjacent to the second conductive sub-plate CP42. As shown in FIG. 6B, the first intermediate connection structure IM1 includes two terminals IM11, IM12 respectively extending along radial directions of the second conductive sub-plates CP42, CP44 (in the present disclosure, the radial direction of the second conductive sub-plate CP42 is defined as a direction along the fourth window mesh block MB42 to which the second conductive sub-plate CP42 is connected; and the radial direction of the second conductive sub-plate CP44 is defined as a direction along the fourth window mesh block MB44 to which the second conductive sub-plate CP44 is connected) and directly connected to the two second conductive sub-plates CP42, CP44; and a first intermediate main portion IM13 located between the two terminals IM11, IM12 and extending along the fourth portion P4 of the periphery of the window region WR. In one embodiment, the first intermediate main portion IM113 may also be a fan-shaped arc; the fourth conductive structure further includes at least one second intermediate connection structure IM2, two ends of which are connected to two adjacent third conductive sub-plates of the at least one third conductive sub-plate CP43, CP45, and CP46, respectively (for the embodiment shown in FIG. 6B). In the embodiment shown in FIG. 7, the touch structure further includes at least one third intermediate connection structure IM3, two ends of which are respectively connected between the farthest third conductive sub-plate CP43 and the auxiliary conductive sub-plate CP45' adjacent to the farthest third conductive sub-plate CP43, and between the two adjacent auxiliary conductive sub-plates CP45' and CP46'. The second intermediate connection structure IM2 includes two terminals IM21, IM22 and a second intermediate main portion IM23 between the two terminals IM21, IM22; the third intermediate connection structure IM3 includes two terminals IM31, IM32 and a second intermediate main portion IM33 between the two terminals IM31, IM32.

As shown in FIG. 6B, the fourth conductive bridge CB4 includes a fourth main portion CB42, which may be formed as a fan-shaped ring, extending along the fourth portion P4 of the periphery of the window region WR; and a fourth terminal CB41 extending along the radial direction of the second conductive sub-plate CP42; similarly, the fifth conductive bridge CB5 includes a fifth main portion CB52, which may be formed as a fan-shaped ring, extending along the fourth portion P4 of the periphery of the window region WR; and a fifth terminal CB51 extending along the radial direction of the third conductive sub-plate CP43. The fourth conductive bridge CB4 extends through a side, on which the fourth main portion CB42 of the fourth portion P4 of the periphery of the window region WR at is located, of the fifth conductive sub-plate CP52 away from the fifth window mesh block MB5. The touch structure further includes a fifth dummy plate DP52 between the fourth main portion CB2 and the fifth conductive sub-plate CP52. The fifth conductive bridge CB5 extends through a side, on which the fifth main portion CB52 of the fourth portion P4 of the periphery of the window region WR at is located, of the sixth conductive sub-plate CP63 away from the sixth window mesh block MB6. The touch structure further includes a sixth dummy plate DP63 positioned between the fifth conductive bridge CB5 and the sixth conductive sub-plate CP63. Further, as shown in FIG. 7, the first intermediate main portion IM13 of the first intermediate connection structure IM1 is located on a side of the fifth conductive sub-plate CP51 away from the fifth window mesh block MB5. The touch structure further includes a seventh dummy plate DP51 located between the first intermediate main portion IM13 of the first intermediate connection structure IM1 and the fifth conductive sub-plate CP51; the second intermediate main portion IM23 of the second intermediate connection structure IM2 is on a side of the sixth conductive sub-plates CP62, CP61 away from the sixth window mesh block MB6. The touch structure further includes eleventh dummy plates DP62, DP61 (as shown in FIG. 6B) between the second intermediate main portion IM23 of the second intermediate connection structure IM2 and the sixth conductive sub-plates CP62, CP61. In the embodiment shown in FIG. 7, the third intermediate main portion IM33 of the third intermediate connection structure IM3 is on a side of the sixth conductive sub-plates CP2, CP61 away from the sixth window mesh block MB6. The touch structure further includes twelfth dummy plates DP62', DP61' between the third intermediate main portion IM33 of the third intermediate connection structure IM3 and the sixth conductive plates CP62, CP61. The fifth and seventh dummy plates DP52 and DP51 between the first conductive plate CP1 and the first conductive sub-plate CP41 and along the fourth portion P4 of the periphery of the window region WR, and the sixth dummy plate DP63, the eleventh dummy plates DP62 and DP61, the twelfth dummy plates DP61' and DP62' between the third conductive plate CP3 and the first conductive sub-plate CP41 and along the fourth portion P4 of the periphery of the window region WR are all in a floating state. In one embodiment, each of the fifth dummy plate DP51, the seventh dummy plate DP52, the sixth dummy plate DP63, the eleventh dummy plates DP62, DP61, the twelfth dummy plates DP62', DP61' may be a fan-shaped arc, for preventing the capacitance from being over-compensated and shading the touch structure. As shown in FIG. 6B and FIG. 7, the touch structure further includes: a protection ring PR on a side of the first, second, third, fourth, fifth, and sixth window mesh blocks MB1, MB2, MB3, MB4, MB5, and MB6 close to the window region WR and extending around the window region WR. For example, the protection ring PR may have a circular ring shape, and be located inside the window region WR, and an orthographic projection of the protection ring PR on the touch insulating layer TI is located inside each of the compensation metal patterns of the touch structure. As shown in FIG. 7, the protection ring PR is a closed circular ring, but the present disclosure is not limited thereto. For example, a circular ring with a cutout may be formed to discharge static electricity.

In the present disclosure, a dummy plate being in a "floating state" means that the dummy plate is not connected or in contact with other components, and in the present disclosure, is disposed between two conductive plates or between a conductive plate and a conductive bridge, to avoid excessive mutual capacitance between the two conductive plates or between the conductive plate and the conductive bridge, resulting in the over-compensation. In addition, the light-shielding function may be achieved.

In order to prevent signal interference between the metal patterns and to prevent the influence of light irradiation on the touch structure, as shown in FIG. 6B, the touch structure may further include eighth dummy plates DP81, DP82 in a floating state, and orthographic projections of the eighth dummy plates DP81, DP82 on the touch insulating layer TI are located between orthographic projections of the second conductive sub-plates CP42, CPP44 on the touch insulating layer TI and an orthographic projection of the protection ring PR on the touch insulating layer TI, respectively; similarly, the touch structure may include ninth dummy plates DP9, DP10, DP11 in a floating state, and orthographic projections of the ninth dummy plates DP9, DP10, DP11 on the touch insulating layer TI are located between orthographic projections of the third conductive sub-plates CP43, CP45, CP46 on the touch insulating layer TI and the orthographic projection of the protection ring PR on the touch insulating layer TI, respectively. As shown in FIG. 6B, the eighth dummy plates DP81, DP82 and the ninth dummy plates DP9, DP10, DP11 and the second and third conductive sub-plates CP42 and CP43 may be all disposed in the second metal layer TMB. In one embodiment, the protection ring PR is in the same layer, i.e., the first metal layer TMA, as the first conductive bridge CB1 and the second conductive bridge CB2.

In addition, as shown in FIG. 7, for the auxiliary conductive sub-plates CP45' and CP46', the touch structure of the present disclosure further includes tenth dummy plates DP10' and DP11'. Similar to the eighth dummy plates DP81, DP82 and the ninth dummy plate DP9 shown in FIG. 7, the tenth dummy plates DP10', DP11' are also provided in the second metal layer TMB, which also serve to prevent signal interference and shield light.

In the embodiments shown in FIGS. 6B and 7, as described above, the touch structure has a relatively complex structure on the fourth side S4 because the window region WR crosses over two cross-window rows (i.e., the first cross-window row Rwc1 and the second cross-window row Rwc2). Specifically, as shown in FIGS. 6B and 7, the plurality of mesh lines of the first mesh electrode TE1 and the second mesh electrode TE2 alternately contact the fourth side S4 of the periphery of the window region WR, and thus, it is necessary to alternately dispose the conductive plates for compensating the mesh lines missing from the first mesh electrode TE1 and the conductive plates for compensating the mesh lines missing from the second mesh electrode TE2 correspondingly.

Specifically, as shown in FIG. 6B, on a side of the fourth portion P4 along the periphery of the window region WR close to the first conductive plate CP1, the fourth conductive bridge CB4, the fifth conductive sub-plate CP52 and the fifth dummy plate DP52 therebetween, the second conductive sub-plate CP42 and the eighth dummy plate DP81 may be regarded as one first cycle structure; the first intermediate connection structure IM1, the fifth conductive sub-plate CP51 and the seventh dummy plate DP51 therebetween, the second conductive sub-plate CP44 and the eighth dummy plate DP82 may be regarded as one first cycle structure, and thus the fourth conductive structure may be regarded as including two substantially identical first cycle structures on a side close to the first conductive plate CP1; on a side of the fourth portion P4 along the periphery of the window region WR close to the third conductive plate CP3, the fifth conductive bridge CB5, the sixth conductive sub-plate CP63, and the sixth dummy plate DP63 therebetween, the third conductive sub-plate CP43, and the ninth dummy plate DP91 may be regarded as one second cycle structure; the second intermediate connection structure IM2, the sixth conductive sub-plate CP62, and the eleventh dummy plate DP62 therebetween, the third conductive sub-plate CP45, and the ninth dummy plate DP92 may be regarded as one second cycle structure; the second intermediate connection structure IM2, the sixth conductive sub-plate CP61, and the eleventh dummy plate DP61 therebetween, the third conductive sub-plate CP46, and the ninth dummy plate DP93 may be regarded as one second cycle structure. Thus, in the second cross-window row Rwc, for the position where the finger-shaped mesh sub-blocks of the first and second mesh electrodes TE1 and TE2 cross each other, the touch structure includes at least two first cycle structures in a direction from the first conductive sub-plate CP41 to the first conductive plate CP1 along the fourth portion P4 of the periphery of the window region WR; and the touch structure includes at least three second cycle structures in a direction from the first conductive sub-plate CP41 to the third conductive plate CP3 along the fourth portion P4 of the periphery of the window region WR, so that a desired compensation pattern may be easily obtained and the touch structure of the present disclosure may be manufactured using a simple mask and process.

Similarly, as shown in FIG. 7, on a side of the fourth portion P4 along the periphery of the window region WR close to the first conductive plate CP1, the fourth conductive bridge CB4, the fifth conductive sub-plate CP52 and the fifth dummy plate DP52 therebetween, the second conductive sub-plate CP42 and the eighth dummy plate DP81 may be regarded as one first cycle structure; the first intermediate connection structure IM1, the fifth conductive sub-plate CP51 and the seventh dummy plate DP51 therebetween, the second conductive sub-plate CP44 and the eighth dummy plate DP82 may be regarded as one first cycle structure. Thus, the fourth conductive structure may be regarded as including two substantially identical first cycle structures on a side close to the first conductive plate CP1. On a side of the fourth portion P4 along the periphery of the window region WR close to the third conductive plate CP3, the fifth conductive bridge CB5, the sixth conductive sub-plate CP63, and the sixth dummy plate DP63 therebetween, the third conductive sub-plate CP43, and the ninth dummy plate DP91 may be regarded as one second cycle structure; the second intermediate connection structure IM2, the sixth conductive sub-plate CP62, and the twelfth dummy plate DP62' therebetween, the auxiliary conductive sub-plate CP45' and the tenth dummy plate DP10 may be regarded as one second cycle structure; the second intermediate connection structure IM2, the sixth conductive sub-plate CP61, and the twelfth dummy plate DP61' therebetween, the auxiliary conductive sub-plate CP46' and the tenth dummy plate DP11 may be regarded as one second cycle structure. Thus, in the second cross-window row Rwc, for the position where the finger-shaped mesh sub-blocks of the first and second mesh electrodes TE1 and TE2 cross each other, the touch structure includes at least two first cycle structures in a direction from the first conductive sub-plate CP41 to the first conductive plate CP1 along the fourth portion P4 of the periphery of the window region WR; and the touch structure includes at least three second cycle structures in a direction from the first conductive sub-plate CP41 to the third conductive plate CP3 along the fourth portion P4 of the periphery of the window region WR, so that a desired compensation pattern may be easily obtained and the touch structure of the present disclosure may be manufactured using a simple mask and process.

As shown in FIG. 6B, in order to further increase the touch signal transmission path so as to sufficiently achieve the compensation, the fourth conductive structure employs a concavo-convex structure on the fourth side S4 along the window region WR. That is, the fourth conductive bridge CB4 and the fifth conductive bridge CB5 are directly connected to both ends of a side of the first conductive sub-plate CP41 close to the window region through the fourth main portion CB42 and the fifth main portion CB52, respectively; each of the first, second and third intermediate connection structures IM1, IM2 and IM3 includes a terminal extending from a side close to the window region WR to a side away from the window region WR, and the first, second and third intermediate connection structures IM1, IM2 and IM3 are respectively connected to the second, and third conductive sub-plates CP42, CP44 and CP43, CP45, CP46 on the side away from the window region WR; the second conductive sub-plates CP42 and CP44 and the third conductive sub-plates CP43, CP45 and CP46 respectively connect the fourth conductive structure to a side close to the window region WR through conductive bridges (the sixth conductive bridge CB6 and the seventh conductive bridge CB7, respectively), so that cycle structures, each of which is similar to the concave-convex structure, are respectively formed on both sides of the first conductive sub-plate CP1, thereby increasing the touch signal transmission path to satisfy a compensation requirement. In addition, as shown in FIG. 6B, a structure (the fifth conductive sub-plates CP51, CP52, the sixth conductive sub-plates CP61, CP62, CP63) for compensating the missing patterns for the fifth window mesh block MB5 and the sixth window mesh block MB6 of the second cross-window row Rwc2 may be provided in the concavo-convex structures to improve the mutual capacitance. In this process, the over-compensation may be caused, and in this case, dummy plates (e.g., the eighth dummy plates DP81, DP82, the ninth dummy plates DP91, DP92, DP93) may be further provided according to the simulation to avoid the over-compensation.

Similarly, in the embodiment shown in FIG. 7, in order to further increase the touch signal transmission path so as to sufficiently achieve the compensation, the fourth conductive structure employs a concavo-convex structure on the fourth side S4 along the window region WR. That is, the fourth conductive bridge CB4 and the fifth conductive bridge CB5 are directly connected to both ends of a side of the first conductive sub-plate CP41 close to the window region through the fourth main portion CB42 and the fifth main portion CB52, respectively; each of the first, second and third intermediate connection structures IM1, IM2 and IM3 includes a terminal extending from a side close to the window region WR to a side away from the window region WR, and the first, second and third intermediate connection structures IM1, IM2 and IM3 are respectively connected to the second, and third conductive sub-plates CP42, CP44 and CP43 and the auxiliary conductive sub-plates CP45', CP46' on the side away from the window region WR; the second, and third conductive sub-plates CP42, CP44 and CP43 and the auxiliary conductive sub-plates CP45', CP46' respectively connect the fourth conductive structure to a side close to the window region WR through conductive bridges (the sixth conductive bridge CB6 and the seventh conductive bridge CB7, respectively), so that cycle structures, each of which is similar to the concave-convex structure, are respectively formed on both sides of the first conductive sub-plate CP1, thereby increasing the touch signal transmission path to satisfy a compensation requirement. In addition, as shown in FIG. 7, a structure (the fifth conductive sub-plates CP51, CP52, the sixth conductive sub-plates CP61, CP62, CP63) for compensating the missing patterns for the fifth window mesh block MB5 and the sixth window mesh block MB6 of the second cross-window row Rwc2 may be provided in the concavo-convex structures to improve the mutual capacitance. In this process, the over-compensation may be caused, and in this case, dummy plates (e.g., the eighth dummy plates DP81, DP82, the ninth dummy plate DP91 and the tenth dummy plates DP10, DP11) may be further provided according to the simulation to avoid the over-compensation.

In one embodiment, for example, the first conductive bridge CB1, the second conductive bridge CB2, and the protection ring PR are in the same first metal layer TMA, and made of a first material; the first conductive plate CP1, the second conductive plate CP2, the third conductive plate CP3, the first conductive sub-plate CP41, the second conductive sub-plates CP42, CP44, the third conductive sub-plates CP43, CP45, CP46, the auxiliary conductive sub-plates CP45', CP46', the fifth conductive sub-plates CP51, CP52, the sixth conductive sub-plates CP61, CP62, CP63, the third conductive bridge CB3, the fourth conductive bridge CB4, the fifth conductive bridge CB5, the sixth conductive bridge CB6, the seventh conductive bridge CB7, the first intermediate connection structure IM1, the second intermediate connection structure IM2, and the third intermediate connection structure IM3 are in the same second metal layer TMB, and made of a second material; and a resistance of the first material is greater than the resistance of the second material.

In addition, the first dummy plate DP1, the second dummy plate DP2, the third dummy plate DP3, the fifth dummy plate DP52, the seventh dummy plate DP51, the sixth dummy plate DP63, the eleventh dummy plates DP61, DP62, the eleventh dummy plate DP62', DP61', the eighth dummy plates DP81, DP82, the ninth dummy plates DP91, DP92, the tenth dummy plates DP10, DP11, and the first conductive plate CP1, the second conductive plate CP2, the third conductive plate CP3, the first conductive sub-plate CP41, the second conductive sub-plates CP42, CP44, the third conductive sub-plates CP43, CP45, CP46, the fifth conductive sub-plates CP51, CP52, the sixth conductive sub-plates CP61, CP62, CP63, the auxiliary conductive sub-plates CP45', CP46', the third conductive bridge CB3, the fourth conductive bridge CB4, the fifth conductive bridge CB5, the sixth conductive bridge CB6, and the seventh conductive bridge CB7 are in the same second metal layer TMB, and made of the second material.

Orthographic projections of the first dummy plate DP1, the second dummy plate DP2, the third dummy plate DP3, the fifth dummy plate DP52, the seventh dummy plate DP51, the sixth dummy plate DP63, the eleventh dummy plates DP62, DP61, the twelfth dummy plates DP62', DP61', the eighth dummy plates DP81, DP82, the ninth dummy plates DP91, DP92, DP93, and the tenth dummy plates DP10, DP11 and the first conductive plate CP1, the second conductive plate CP2, the third conductive plate CP3, the first conductive sub-plate CP41, the second conductive sub-plates CP42, CP44, the third conductive sub-plates CP43, CP45, CP46 (the third conductive sub-plate CP43, the auxiliary conductive sub-plates CP45', CP46'), the fifth conductive sub-plates CP51, CP52, the sixth conductive sub-plates CP61, CP62, CP63, the third conductive bridge CB3, the fourth conductive bridge CB4, the fifth conductive bridge CB5, the six conductive bridge CB6, the seventh conductive bridge CB7, the first conductive bridge CB1 and the second conductive bridge CB2 on the touch insulating layer TI do not overlap each other; and are a plurality of fan-shaped rings having a same circle center, which are combined into an approximate circular ring.

An orthographic projection of the circle center of the plurality of fan-shaped rings on the touch insulating layer TI coincides with an orthographic projection of the circle center of the protection ring PR on the touch insulating layer TI, so that a compact touch structure with an effective capacitance compensation is formed. The circle center of each fan-shaped ring represents the circle center of the whole circular ring where the fan-shaped ring is located.

Reference may be made to cross-sectional views along lines AA' and BB' in FIG. 6A, which are respectively shown in FIGS. 10 and 11. FIG. 10 shows that the second conductive plate CP2 is connected to the first conductive bridge CB1 through the first via V1 in the touch insulating layer TI, wherein the first conductive plate CP2 is in the second metal layer TMB and the first conductive bridge CB1 is in the first metal layer TMA; FIG. 11 shows that the first conductive bridge CB1 is connected to the sixth conductive bridge CB6 through the third via V3 in the touch insulating layer TI, wherein the sixth conductive bridge CB6 is in the second metal layer TMB.

Various suitable materials and various suitable manufacturing methods may be used to form the respective metal patterns of the second conductive layer TMB, including the first conductive plate CP1, the second conductive plate CP2, the third conductive plate CP3, etc., the first dummy plate DP1, the second dummy plate DP2, etc., and the third conductive bridge CB3, the fourth conductive bridge CP4, etc. For example, a metal material may be deposited on the touch insulating layer TI through a plasma enhanced chemical vapor deposition (PECVD) process; examples of suitable metal materials include, but are not limited to, aluminum, chromium, tungsten, titanium, tantalum, molybdenum, copper, and alloys or laminates containing the same.

Various suitable conductive electrode materials may be used to form the patterns of the first mesh electrodes TE1 and the second mesh electrodes TE2 of the touch structure of the present disclosure. In some embodiments, the conductive electrode material used to form the patterns of mesh electrodes is a transparent conductive electrode material. Examples of conductive electrode materials used to form the patterns of mesh electrodes of the touch electrode layer include, but are not limited to, metal mesh, silver nanowires, carbon nanotubes, nanomesh, graphene, and conductive polymers such as poly (3, 4-ethylenedioxythiophene) polystyrene sulfonate (PEDOT:PSS). Optionally, the patterns of mesh electrodes are made of a metal mesh, such as a silver nanomesh.

In another aspect, the present disclosure provides a display panel including: a touch structure described herein; and a hole in the window region. The display panel is configured to display an image in at least a portion of the touch region. In some embodiments, no display elements of the display panel are present in the window region.

Figure 14A:
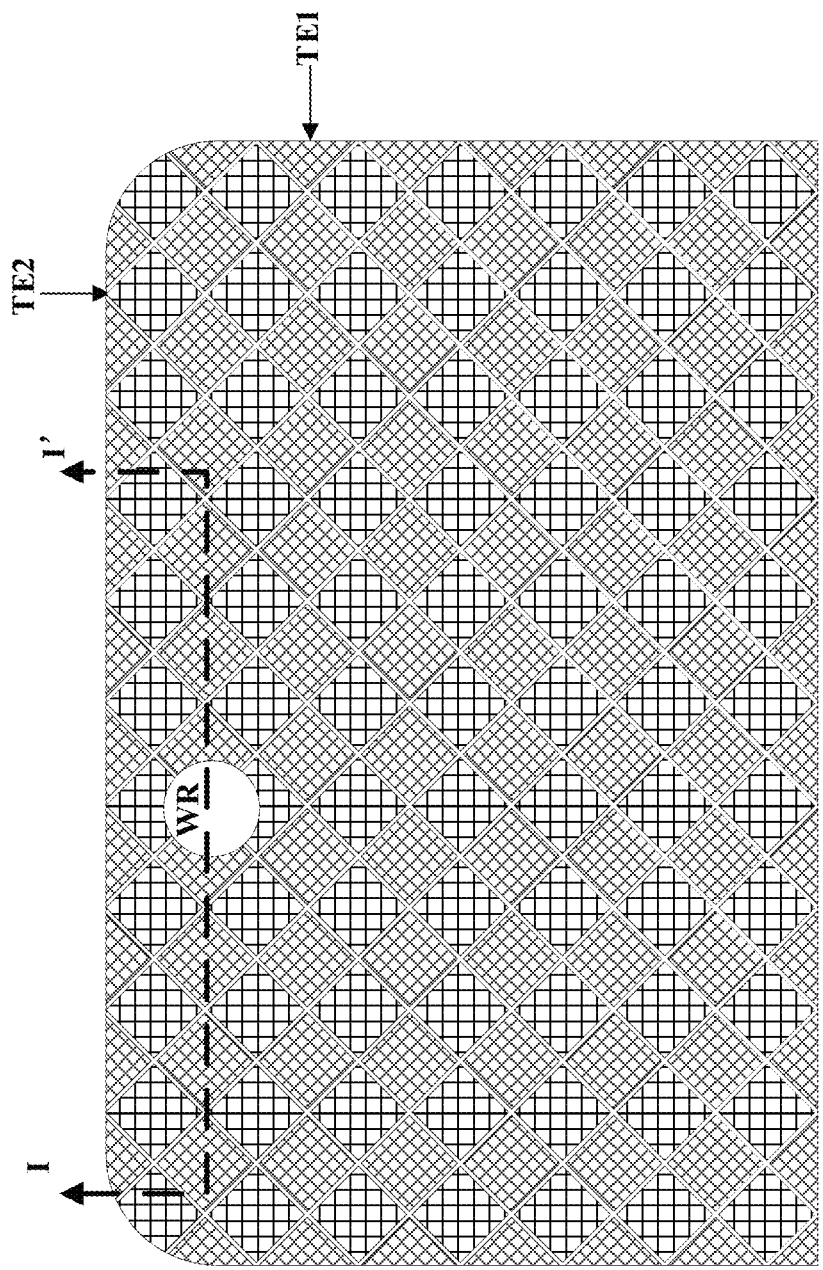
FIG. 14A is a plan view of a display panel in some embodiments according to the present disclosure.
Figure 14B:
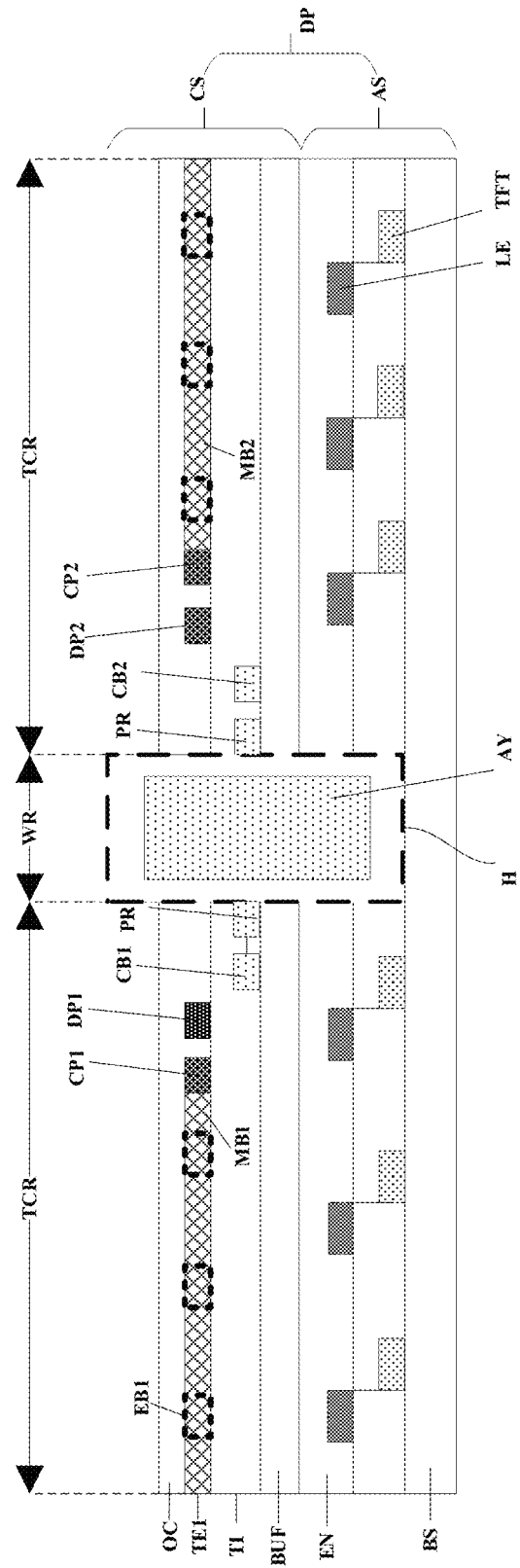
FIG. 14B is a cross-sectional view along a line I-I' in FIG. 14A.

FIG. 14A is a plan view of a display panel in some embodiments according to the present disclosure; FIG. 14B is a cross-sectional view along a line I-I' in FIG. 14A. Referring to FIGS. 14A and 14B, in some embodiments, the display panel includes an array substrate AS and an opposite substrate (counter substrate) CS assembled together. The display panel has a touch region TCR configured to detect a touch and a window region WR surrounded by the touch region TCR. The touch structure is defined in the touch region TCR and is not present in the window region WR. Optionally, the touch region TCR substantially overlaps the display region (shown as AA Edge in FIG. 4B) of the display panel. The display panel is configured to display an image in at least a portion of the touch region TCR. In one example, in the window region WR, no display element of the display panel is absent, and no touch structure is absent; in at least a portion of the display region or the touch region TCR, both the display elements and the touch structure of the display panel are present.

Referring to FIG. 14B, in some embodiments, the display panel includes a hole H in the window region WR. Optionally, the hole H extends through the array substrate AS and the opposite substrate CS. Referring to FIG. 14B, in some embodiments, the display panel further includes an accessory AY in the hole H. Examples of accessories include a camera lens and a fingerprint sensor.

In some embodiments, the hole H is a blind hole that does not extend completely through at least one layer of the array substrate AS or the opposite substrate CS. In some embodiments, the hole H is a through hole extending completely through the array substrate AS and the opposite substrate CS.

In some embodiments, no display elements and thin film transistors are present in the window region WR. Optionally, the display element includes a plurality of organic light emitting diodes in an organic light emitting diode display panel, for example. Optionally, the display element includes a liquid crystal layer in a plurality of sub-pixels in a liquid crystal display panel, for example. Optionally, the display element includes a plurality of quantum dot light emitting diodes in a quantum dot light emitting diode display panel, for example. Referring to FIG. 14B, in some embodiments, the array substrate AS includes a base substrate BS, a plurality of thin film transistors TFT on the base substrate BS, and a plurality of light emitting elements LE on the base substrate BS and respectively connected to the plurality of thin film transistors TFT. Optionally, the plurality of thin film transistors TFT are not present in the window region WR. Optionally, the plurality of light emitting elements LE are not present in the window region WR.

Referring to FIG. 14B, in some embodiments, the array substrate AS further includes an encapsulation layer EN encapsulating the plurality of light emitting elements LE. Optionally, the encapsulation layer EN is present in the touch region TCR (or the display region) and absent in the window region WR. In some embodiments, the opposite substrate CS includes a buffer layer BUF and the touch insulating layer TI on the buffer layer BUF. Optionally, the buffer layer BUF and the touch insulating layer TI are present in the touch region TCR (or the display region) and absent in the window region WR.

In another aspect, the present disclosure provides a display device including the display panel as described herein or manufactured by the methods described herein, and one or more integrated circuits connected to the display panel. Examples of suitable display devices include, but are not limited to, electronic paper, mobile phones, tablet computers, televisions, monitors, notebook computers, digital photo albums, GPS, and the like. Optionally, the display device is an organic light emitting diode display device. Optionally, the display device is a quantum dot light emitting diode display device. Optionally, the display device is a liquid crystal display device.

The foregoing descriptions of embodiments of the present disclosure have been presented for purposes of illustration and description. It is not intended to be exhaustive or to limit the present disclosure to the precise form or exemplary embodiments disclosed. The foregoing description is, therefore, to be considered illustrative rather than restrictive. Obviously, many modifications and variations will be apparent to one of ordinary skill in the art. The scope of the present disclosure is defined by the appended claims and equivalents thereof.

What is claimed is:

1. A touch structure, comprising: a plurality of first mesh electrodes extending in a first direction and a plurality of second mesh electrodes extending in a second direction intersecting the first direction,
    wherein the touch structure is defined in a touch region and is absent in a window region surrounded by the touch region;
    wherein the plurality of first mesh electrodes comprise at least one cross-window row separated by the window region, the at least one cross-window row comprises a first cross-window row and the first cross-window row comprises:
    a first window mesh block adjacent to the window region and on a first side of the window region;
    a first conductive plate directly connected to a plurality of mesh lines of the first window mesh block; and
    a first non-window mesh block on a side of the first window mesh block away from the window region;
    wherein the plurality of second mesh electrodes comprise at least one cross-window column separated by the window region, the at least one cross-window column comprises a first cross-window column and the first cross-window column comprises:
    a second window mesh block adjacent to the window region and on a second side of the window region;
    a second conductive plate directly connected to a plurality of mesh lines of the second window mesh block; and
    a second non-window mesh block on a side of the second window mesh block away from the window region;
    wherein the first and second conductive plates extend along first and second portions of a periphery of the window region, respectively;
    an area of the first conductive plate is positively correlated to that of a missing portion of the first window mesh block with respect to the first non-window mesh block, and an area of the second conductive plate is positively correlated to that of a missing portion of the second window mesh block with respect to the second non-window mesh block,
    the first cross-window column further comprises a first conductive bridge and a second conductive bridge, and
    a first end of the first conductive bridge is directly connected to a first end of the second conductive plate, and a first end of the second conductive bridge is directly connected to a second end of the second conductive plate opposite to the first end; and
    the first cross-window row further comprises:
    a third window mesh block adjacent to the window region and on a third side of the window region opposite to the first side;

a third conductive plate directly connected to a plurality of mesh lines of the third window mesh block and extending along a third portion of the periphery of the window region; and a third conductive bridge connecting a first end of the first conductive plate and a first end of the third conductive plate together, wherein the second side is between the first side and the third side.

2. The touch structure of claim 1, wherein the first conductive plate and the second conductive plate are both fan-shaped rings;

an area of the first non-window mesh block is substantially equal to that of the second non-window mesh block;

an area of the first window mesh block is greater than ½ of the area of the first non-window mesh block, an area of the second mesh window-block is greater than ½ of the area of the second non-window mesh block;

a length of the first conductive plate close to the window region is greater than that of the second conductive plate close to the window region; and a first width of the first conductive plate along a third direction perpendicular to an interface between the first conductive plate and the first window mesh block is greater than a second width of the second conductive plate along a fourth direction perpendicular to an interface between the second conductive plate and the second window mesh block.

3. The touch structure of claim 1, wherein the first conductive plate and the second conductive plate are both fan-shaped rings;

an area of the first non-window mesh block is substantially equal to that of the second non-window mesh block;

an area of the first window mesh block is less than ½ of the area of the first non-window mesh block, an area of the second window mesh block is less than ½ of the area of the second non-window mesh block;

a length of the first conductive plate close to the window region is less than that of the second conductive plate close to the window region; and a first width of the first conductive plate along a third direction perpendicular to an interface between the first conductive plate and the first window mesh block is greater than a second width of the second conductive plate along a fourth direction perpendicular to an interface between the second conductive plate and the second window mesh block.

4. The touch structure of claim 1, wherein the first conductive plate and the second conductive plate are both fan-shaped rings;

an area of the first non-window mesh block is substantially equal to that of the second non-window mesh block;

an area of the first window mesh block is less than ½ of the area of the first non-window mesh block, an area of the second mesh window-block is greater than ½ of the area of the second non-window mesh block; and a first width of the first conductive plate along a third direction perpendicular to an interface between the first conductive plate and the first window mesh block is greater than a second width of the second conductive plate along a fourth direction perpendicular to an interface between the second conductive plate and the second window mesh block.

5. The touch structure of claim 1, wherein the first conductive bridge comprises a first connection portion directly connected to the first end of the second conductive plate; and a first main portion directly connected to the first connection portion, extending along a first portion of the periphery of the window region and closer to the window region than the first conductive plate;

the second conductive bridge comprises a second connection portion directly connected to the second end of the second conductive plate; and a second main portion directly connected to the second connection portion, extending along the third portion of the periphery of the window region, and closer to the window region than the third conductive plate; and the third conductive bridge comprises a third connection portion, a fourth connection portion, and a third main portion, wherein the third main portion is between the third connection portion and the fourth connection portion, the third connection portion and the fourth connection portion are directly connected to the first end of the first conductive plate and the first end of the third conductive plate, respectively, the third main portion is directly connected to the third connection portion and the fourth connection portion, extends along the second portion of the periphery of the window region, and is closer to the window region than the second conductive plate;

wherein the first, second, and third main portions are all fan-shaped rings; and orthographic projections of the first, second and third main portions do not overlap each other; and the first conductive bridge and the second conductive bridge are in a first metal layer;

the first conductive plate, the second conductive plate, the third conductive plate, and the third conductive bridge are in a second metal layer;

the touch structure further comprises a touch insulating layer between the first metal layer and the second metal layer; and the touch structure further comprises first and second vias respectively extending through the touch insulating layer, and the first and second conductive bridges are connected to the second conductive plate through the first and second vias, respectively.

6. The touch structure of claim 5, further comprising:

a first dummy plate in the second metal layer and in a floating state, wherein an orthographic projection of the first dummy plate on the touch insulating layer is between an orthographic projection of the first conductive plate on the touch insulating layer and an orthographic projection of the first conductive bridge on the touch insulating layer; and a second dummy plate in the second metal layer and in a floating state, wherein an orthographic projection of the second dummy plate on the touch insulating layer is between an orthographic projection of the second conductive plate on the touch insulating layer and an orthographic projection of the third conductive bridge on the touch insulating layer; and a width of the first dummy plate in the third direction is less than a width of the second dummy plate in the fourth direction.

7. The touch structure of claim 5, wherein
the first cross-window column further comprises:
a fourth window mesh block adjacent to the window region and on a fourth side of the window region opposite to the second side; and
a fourth conductive structure connected to the fourth window mesh block, wherein a first end of the fourth conductive structure is connected to a second end of the first conductive bridge, and a second end of the fourth conductive structure is connected to a second end of the second conductive bridge.

8. The touch structure of claim 7, wherein
the fourth window mesh block comprises a first window mesh sub-block, at least one second window mesh sub-block, and at least one third window mesh sub-block, the first window mesh sub-block is between the at least one second window mesh sub-block and the at least one third window mesh sub-block along the periphery of the window region, the at least one second window mesh sub-block is closer to the first window mesh block than the first window mesh sub-block, the at least one third window mesh sub-block is closer to the third window mesh block than the first window mesh sub-block;
the fourth conductive structure comprises a first conductive sub-plate, at least one second conductive sub-plate, at least one third conductive sub-plate, a sixth conductive bridge and a seventh conductive bridge;
the first conductive sub-plate is directly connected to a plurality of mesh lines of the first window mesh sub-block and extends along a fourth portion of the periphery of the window region;
the at least one second conductive sub-plate is one-to-one correspondence with the at least one second window mesh sub-block and is directly connected to a plurality of mesh lines of the at least one second window mesh sub-block, respectively, and extends along the fourth portion of the periphery of the window region;
the at least one third conductive sub-plate is one-to-one correspondence with the at least one third window mesh sub-block and is directly connected to a plurality of mesh lines of the at least one third window mesh sub-block, respectively, and extends along the fourth portion of the periphery of the window region;
a first end of the first conductive sub-plate is connected to a first end of a nearest second conductive sub-plate, which is closest to the first conductive sub-plate, of the at least one second conductive sub-plate, and a second end of the first conductive sub-plate is connected to a first end of a nearest third conductive sub-plate, which is closest to the first conductive sub-plate, of the at least one third conductive sub-plate;
a second end of a farthest second conductive sub-plate, which is farthest from the first conductive sub-plate, of the at least one second conductive sub-plate is connected to the first conductive bridge through the sixth conductive bridge;
a second end of a farthest third conductive sub-plate, which is farthest from the first conductive sub-plate, of the at least one third conductive sub-plate is connected to the second conductive bridge through the seventh conductive bridge;
the at least one second conductive sub-plate is sequentially connected between the first end of the first conductive sub-plate and the sixth conductive bridge through the nearest second conductive sub-plate and the farthest second conductive sub-plate; and the at least one third conductive sub-plate is sequentially connected between the second end of the first conductive sub-plate and the seventh conductive bridge through the nearest third conductive sub-plate and the farthest third conductive sub-plate;
the at least one second window mesh sub-block comprises two second window mesh sub-blocks which are sequentially arranged between the first window mesh sub-block and the first window mesh block and comprise a nearest second window mesh sub-block adjacent to the first window mesh sub-block and a farthest second window mesh sub-block adjacent to the first window mesh block;
the at least one second conductive sub-plate comprises two second conductive sub-plates, wherein the farthest second conductive sub-plate is directly connected to a plurality of mesh lines of the farthest second window mesh sub-block;
the at least one third window mesh sub-block comprises three third window mesh sub-blocks which are sequentially arranged between the first window mesh sub-block and the third window mesh sub-block and comprise a nearest third window mesh sub-block adjacent to the first window mesh sub-block and a farthest third window mesh sub-block adjacent to the third window mesh block; and
the at least one third conductive sub-plate comprises three third conductive sub-plates, wherein the farthest third conductive sub-plate is directly connected to a plurality of mesh lines of the farthest third window mesh sub-block;
wherein the fourth conductive structure further comprises:
a fourth conductive bridge having a first end directly connected to the first end of the first conductive sub-plate; and
a fifth conductive bridge having a first end directly connected to the second end of the first conductive sub-plate;
a first end of the nearest third conductive sub-plate is connected to a second end of the fifth conductive bridge, and a first end of the nearest second conductive sub-plate is connected to a second end of the fourth conductive bridge;
wherein a first end of the sixth conductive bridge is directly connected to a second end of the farthest second conductive sub-plate;
a first end of the seventh conductive bridge is directly connected to a second end of the farthest third conductive sub-plate;
the touch structure further comprises a third via and a fourth via respectively extending through the touch insulating layer;
a second end of the sixth conductive bridge is directly connected to the second end of the first conductive bridge through the third via; and
a second end of the seventh conductive bridge is directly connected to the second end of the second conductive bridge through the fourth via;
an orthographic projection of the third via on the touch insulating layer overlaps an orthographic projection of the second end of the first conductive bridge on the touch insulating layer;
an orthographic projection of the fourth via on the touch insulating layer overlaps an orthographic projection of the second end of the second conductive bridge on the touch insulating layer; and the sixth and seventh conductive bridges are in the second metal layer.

9. The touch structure of claim 7, further comprising a third auxiliary conductive bridge comprising a first auxiliary connection portion, a second auxiliary connection portion, and a first auxiliary main portion, wherein the first auxiliary main portion is connected between the first and second auxiliary connection portions, extends along the fourth portion of the window region and is closer to the window region than the fourth conductive structure;
wherein the touch structure further comprises a fifth via and a sixth via respectively extending through the touch insulating layer,
a first end of the first auxiliary connection portion is directly connected to a second end of the first conductive plate through the fifth via, and a second end of the first auxiliary connection portion is directly connected to a first end of the first auxiliary main portion; and a first end of the second auxiliary connection portion is directly connected to a second end of the third conductive plate through the sixth via, and a second end of the second auxiliary connection portion is directly connected to a second end of the first auxiliary main portion; and
the third auxiliary conductive bridge is in the first metal layer.

10. The touch structure of claim 8, wherein
the touch structure further comprises a third via and a fourth via respectively extending through the touch insulating layer; a first end of the sixth conductive bridge is connected to a second end of the farthest second conductive sub-plate through the third via;
a first end of the seventh conductive bridge is connected to a second end of the farthest third conductive sub-plate through the fourth via;
a second end of the sixth conductive bridge is connected to the second end of the first conductive bridge; and
a second end of the seventh conductive bridge is connected to the second end of the second conductive bridge;
an orthographic projection of the third via on the touch insulating layer overlaps an orthographic projection of the second end of the farthest second conductive sub-plate on the touch insulating layer;
an orthographic projection of the fourth via on the touch insulating layer overlaps an orthographic projection of the second end of the farthest third conductive sub-plate on the touch insulating layer; and
the sixth and seventh conductive bridges are in the first metal layer; and
the touch structure further comprises a third auxiliary conductive bridge comprising a first auxiliary connection portion, a second auxiliary connection portion, and a first auxiliary main portion, wherein the first auxiliary main portion is connected between the first auxiliary connection portion and the second auxiliary connection portion, extends along the fourth portion of the window region and is closer to the window region than the fourth conductive structure;
wherein a first end of the first auxiliary connection portion is directly connected to a second end of the first conductive plate, a second end of the first auxiliary connection portion is directly connected to a first end of the first auxiliary main portion, a first end of the second auxiliary connection portion is directly connected to a second end of the third conductive plate, and a second end of the second auxiliary connection portion is directly connected to the second end of the first auxiliary main portion; and
the third auxiliary conductive bridge is in the second metal layer.

11. The touch structure of claim 8, wherein
a length of each of the at least one second conductive sub-plate and the at least one third conductive sub-plate extending along the periphery of the window region is less than a length of the first conductive sub-plate extending along the periphery of the window region;
the first conductive sub-plate, the at least one second conductive sub-plate and the at least one third conductive sub-plate are fan-shaped rings; and
a width of each of the at least one second conductive sub-plate along a direction perpendicular to an interface between the second conductive sub-plate and a corresponding second window mesh sub-block and a width of each of the at least one third conductive sub-plate along a direction perpendicular to an interface between the third conductive sub-plate and a corresponding third window mesh sub-block are both less than a third width of the first conductive sub-plate along a direction perpendicular to an interface between the first conductive sub-plate and the first window mesh sub-block; and
the at least one second window mesh sub-block and the at least one third window mesh sub-block are finger-shaped mesh sub-blocks; and
the width of each of the at least one second conductive sub-plate along the direction perpendicular to the interface between the second conductive sub-plate and the corresponding second window mesh sub-block is substantially equal to the width of each of the at least one third conductive sub-plate along the direction perpendicular to the interface between the third conductive sub-plate and the corresponding third window mesh sub-block.

12. The touch structure of claim 8, wherein
the fourth conductive structure further comprises at least one auxiliary conductive sub-plate, which is not directly connected to mesh lines of the plurality of first mesh electrodes and the plurality of second mesh electrodes, extends along the fourth portion of the periphery of the window region, respectively, and is connected between the farthest third conductive sub-plate and the seventh conductive bridge and/or between the farthest second conductive sub-plate and the sixth conductive bridge, for assisting the first conductive sub-plate, the at least one second conductive sub-plate, and the at least one third conductive sub-plate in compensating for a missing area of the fourth window mesh block with respect to the second non-window mesh block; and
wherein the at least one cross-window row further comprises a second cross-window row adjacent to the first cross-window row,
the second cross-window row comprises:
a fifth window mesh block adjacent to the window region and between the first mesh window sub-block and the first window mesh block, comprising at least one fifth window mesh sub-block, wherein the at least one fifth window mesh sub-block and the at least one second window mesh sub-block are alternately arranged on the fourth side of the window region;
at least one fifth conductive sub-plate directly connected to a plurality of mesh lines of the at least one fifth window mesh sub-block, respectively, wherein the at least one fifth conductive sub-plate and the at least one second conductive sub-plate extend along the fourth portion of the periphery of the window region alternately;

a sixth window mesh block adjacent to the window region and between the first mesh window sub-block and the third window mesh block, comprising at least one sixth window mesh sub-block; and the at least one sixth conductive sub-plate directly connected to a plurality of mesh lines of the at least one sixth window mesh sub-block, respectively;

wherein the at least one auxiliary conductive sub-plate extends along the fourth portion of the periphery of the window region and is connected between the farthest third conductive sub-plate and the seventh conductive bridge, respectively;

a combination of the at least one auxiliary conductive sub-block and the at least one third conductive sub-block, and the at least one sixth conductive sub-block alternately extend along the fourth portion of the periphery of the window region; and the fifth window mesh block and the sixth window mesh block are directly connected to each other on a side of the window region away from the first cross-window row.

13. The touch structure of claim 8, wherein the at least one cross-window row further comprises a second cross-window row adjacent to the first cross-window row, the second cross-window row comprises:

a fifth window mesh block adjacent to the window region and between the first mesh window sub-block and the first window mesh block, comprising at least one fifth window mesh sub-block, wherein the at least one fifth window mesh sub-block and the at least one second window mesh sub-block are alternately arranged on the fourth side of the window region;

at least one fifth conductive sub-plate directly connected to a plurality of mesh lines of the at least one fifth window mesh sub-block, respectively, wherein the at least one fifth conductive sub-plate and the at least one second conductive sub-plate alternately extend along the fourth portion of the periphery of the window region;

a sixth window mesh block adjacent to the window region and between the first mesh window sub-block and the third window mesh block, comprising at least one sixth window mesh sub-block, wherein the at least one sixth window mesh sub-block and the at least one third window mesh sub-block are alternately arranged on the fourth side of the window region; and at least one sixth conductive sub-plate directly connected to a plurality of mesh lines of the at least one sixth window mesh sub-block, respectively, wherein the at least one sixth conductive sub-plate and the at least one third conductive sub-plate alternately extend along the fourth portion of the periphery of the window region; and the fifth window mesh block and the sixth window mesh block are directly connected to each other on a side of the window region away from the first cross-window row;

the at least one fifth window mesh sub-block and the at least one sixth window mesh sub-block are both finger-shaped mesh sub-blocks;

the at least one fifth conductive sub-plate and the at least one sixth conductive sub-plate are fan-shaped rings; and a width of each of the at least one fifth conductive sub-plate along a direction perpendicular to an interface between the fifth conductive sub-plate and a corresponding fifth window mesh sub-block is substantially equal to a width of each of the at least one sixth conductive sub-plate along a direction perpendicular to an interface between the sixth conductive sub-plate and a corresponding sixth window mesh sub-block;

the at least one fifth conductive sub-plate and the at least one sixth conductive sub-plate are in the second metal layer; the fourth conductive bridge comprises a fourth main portion extending along the fourth portion of the periphery of the window region and on a side, which is away from a corresponding fifth window mesh sub-block, of a nearest fifth conductive sub-plate of the at least one fifth conductive sub-plate which is closest to the first conductive sub-plate, the touch structure further comprises a fifth dummy plate between the fourth main portion and the nearest fifth conductive sub-plate, wherein the fifth dummy plate is floating; and/or the fifth conductive bridge comprises a fifth main portion extending along the fourth portion of the periphery of the window region and on a side, which is away from a corresponding sixth window mesh sub-block, of a nearest sixth conductive sub-plate of the at least one sixth conductive sub-plate which is closest to the first conductive sub-plate, the touch structure further comprises a sixth dummy plate between the fifth main portion and the nearest sixth conductive sub-plate, wherein the sixth dummy plate is floating;

the fourth conductive structure further comprises at least one first intermediate connection structure respectively connected between every two adjacent second conductive sub-plates of the at least one second conductive sub-plate, and respectively comprising a first intermediate main portion on a side, which is close to the window region, of a fifth conductive sub-plate other than the nearest fifth conductive sub-plate of the at least one fifth conductive sub-plate, the touch structure further comprises at least one seventh dummy plate between the first intermediate main portion and a corresponding fifth conductive sub-plate, and the at least one seventh dummy plate is floating; and the fourth conductive structure further comprises at least one second intermediate connection structure respectively connected between every two adjacent third conductive sub-plates of the at least one third conductive sub-plate, and respectively comprising a second intermediate main portion on a side, which is close to the window region, of a sixth conductive sub-plate other than the nearest sixth conductive sub-plate of the at least one sixth conductive sub-plate, the touch structure further comprises at least one eleventh dummy plate between the second intermediate main portion and a corresponding fifth conductive sub-plate, and the at least one eleventh dummy plate is floating.

14. The touch structure of claim 13, further comprising: a protection ring on a side of the first, second, third, fourth, fifth, and sixth window mesh blocks close to the window region, wherein the protection ring extends around the periphery of the window region, and is a circular ring or a circular ring with a cutout;

the touch structure further comprises at least one eighth dummy plate in a floating state, wherein an orthographic projection of the at least one eighth dummy plate on the touch insulating layer is respectively located between an orthographic projection of the at least one second conductive sub-plate on the touch insulating layer and an orthographic projection of the protection ring on the touch insulating layer;

at least one ninth dummy plate in a floating state, wherein an orthographic projection of the at least one ninth dummy plate on the touch insulating layer is respectively located between an orthographic projection of the at least one third conductive sub-plate on the touch insulating layer and the orthographic projection of the protection ring on the touch insulating layer.

15. The touch structure of claim 12, further comprising:
a protection ring on a side of the first, second, third, fourth, fifth, and sixth window mesh blocks close to the window region, wherein the protection ring extends around the periphery of the window region, and is a circular ring or a circular ring with a cutout; and at least one tenth dummy plate in a floating state, wherein an orthographic projection of the at least one tenth dummy plate on the touch insulating layer is respectively located between an orthographic projection of the at least one auxiliary conductive sub-plate on the touch insulating layer and an orthographic projection of the protection ring on the touch insulating layer.

16. The touch structure of claim 14, wherein the protection ring is in the first metal layer;
the first metal layer is made of a first material;
the second metal layer is made of a second material; and
the first material has a resistance greater than that of the second material.

17. The touch structure of claim 16, wherein
orthographic projections of the first dummy plate, the second dummy plate, the fifth dummy plate, the sixth dummy plate, the at least one eighth dummy plate and the at least one ninth dummy plate, the first conductive plate, the second conductive plate, the third conductive plate, the first conductive sub-plate, the at least one second conductive sub-plate, the at least one third conductive sub-plate, the at least one fifth conductive sub-plate, the at least one sixth conductive sub-plate, the third conductive bridge, the fourth conductive bridge, the fifth conductive bridge, the sixth conductive bridge, the seventh conductive bridge, the first conductive bridge and the second conductive bridge, the at least one first intermediate connection structure and the at least one second intermediate connection structure on the touch insulating layer do not overlap each other; and the orthographic projections of the first dummy plate, the second dummy plate, the fifth dummy plate, the sixth dummy plate, the at least one eighth dummy plate and the at least one ninth dummy plate, the first conductive plate, the second conductive plate, the third conductive plate, the first conductive sub-plate, the at least one second conductive sub-plate, the at least one third conductive sub-plate, the at least one fifth conductive sub-plate, the at least one sixth conductive sub-plate, the third conductive bridge, the fourth conductive bridge, the fifth conductive bridge, the six conductive bridge, the seventh conductive bridge, the at least one first intermediate connection structure and the at least one second intermediate connection structure, the first conductive bridge and the second conductive bridge on the touch insulating layer are a plurality of fan-shaped rings having a same circle center.

18. The touch structure of claim 17, wherein
an orthographic projection of the circle center of the plurality of fan-shaped rings on the touch insulating layer TI coincides with an orthographic projection of a circle center of the protection ring PR on the touch insulating layer TI.

19. A display panel, comprising: the touch structure of claim 1 and a hole in the window region;
wherein no display elements of the display panel are present in the window region;
the display panel is configured to display an image in at least a portion of the touch region; and
the display panel further comprises an accessory mounted in the window region.

* * * * *